US008516465B2

(12) United States Patent
Damron

(10) Patent No.: US 8,516,465 B2
(45) Date of Patent: Aug. 20, 2013

(54) REGISTER PRESPILL PHASE IN A COMPILER

(75) Inventor: Peter Carl Damron, Fremont, CA (US)

(73) Assignee: Oracle America, Inc., Redwood City, PA (US)

( * ) Notice: Subject to any disclaimer, the term of this patent is extended or adjusted under 35 U.S.C. 154(b) by 928 days.

(21) Appl. No.: 12/631,256

(22) Filed: Dec. 4, 2009

(65) Prior Publication Data

US 2011/0138372 A1 Jun. 9, 2011

(51) Int. Cl.
*G06F 9/45* (2006.01)
(52) U.S. Cl.
USPC .......................................................... 717/154
(58) Field of Classification Search
USPC .......................................................... 717/154
See application file for complete search history.

(56) References Cited

U.S. PATENT DOCUMENTS

| 6,634,024 B2 * | 10/2003 | Tirumalai et al. ............. 717/161 |
| 2008/0184215 A1 * | 7/2008 | Baev et al. .................... 717/155 |
| 2009/0064112 A1 * | 3/2009 | Inagaki et al. ................. 717/140 |

OTHER PUBLICATIONS

Baev et al., "Prematerialization: Reducing Register Pressure for Free," PACT'06, Seattle, Washington, ACM, 10 pages, Sep. 16-20, 2006.
Bodik et al., "Load-Reuse Analysis: Design and Evaluation," Proceedings of the ACM SIGPLAN '99: Conference on Programming Language Design and Implementation (PLDI'99), Atlanta, Georgia, 14 pages, May 1-4, 1999.
Koseki et al., "Spill Code Minimization by Spill Code Motion," IBM Tokyo Research Laboratory, 10 pages, date unknown.
Park et al., "Optimistic Register Coalescing," Proceedings of PACT'98, Paris, France, IEEE, 9 pages, Oct. 12-18, 1998.
Xu et al., "Tetris: A New Register Pressure Control Technique for VLIW Processors," Department of Electrical and Computer Engineering, University of Massachusetts, Amherst, Massachusetts, 10 pages, Jun. 13-16, 2007.

* cited by examiner

*Primary Examiner* — Chun-Kuan Lee
(74) *Attorney, Agent, or Firm* — Polsinelli PC

(57) ABSTRACT

The present disclosure provides a compiler prespill phase that reduces or eliminates excessive register pressure, or locations in the code of a program where live virtual registers exceeds physical registers of a target computing device, prior to register allocation. The prespill phase identifies points of excessive register pressure, selects candidate virtual registers, chooses virtual registers to prespill from the candidates, and inserts spill and reload instructions to prespill the chosen registers. The prespill phase may reduce the register pressure such that the live virtual registers only exceed the physical registers by a particular number, the live virtual registers equal the physical registers, or the physical registers exceed the live virtual registers by a particular number. The compiler may then perform one or more early and/or late instruction scheduling phases, including global and/or local instruction scheduling, to optimize the placement of the spill and reload instructions.

20 Claims, 19 Drawing Sheets

600D

|   | Integer Register 1 | Integer Register 2 | Integer Register 3 | Floating Point Register 1 | Floating Point Register 2 | Floating Point Register 3 |
|---|---|---|---|---|---|---|
| A | I1 | I2 | I3 |   |   |   |
|   | I1 | I2 |   |   |   |   |
| B | I1 | I2 |   |   |   |   |
|   | I1 |   |   | F1 |   |   |
| C | I1 |   | I4 | F1 |   |   |
| D | I1 |   | I4 | F1 |   |   |
| E | I1 |   | I4 | F1 |   |   |
| F | I1 | I5 | I4 | F1 |   |   |
|   | I1 | I6 | I4 | F1 |   |   |
| G | I1 | I6 | I4 | F1 |   |   |
|   |   |   | I4 | F1 |   |   |
| H |   | I2 | I4 | F1 |   |   |
| I |   | I2 | I4 | F1 |   |   |
| J | I5 | I2 | I4 | F1 |   |   |

FIG. 8A

|   | Integer Register 1 | Integer Register 2 | Integer Register 3 | Floating Point Register 1 | Floating Point Register 2 | Floating Point Register 3 |
|---|---|---|---|---|---|---|
| A | I1 | I2 | I3 |   |   |   |
|   | I1 | I2 |   |   |   |   |
| B | I1 | I2 |   |   |   |   |
|   | I1 |   |   | F1 |   |   |
| C | I1 |   | I4 | F1 |   |   |
| D | I1 |   | I4 | F1 |   |   |
| E | I1 |   | I4 | F1 |   |   |
| F | I1 | I5 | I4 | F1 |   |   |
|   | I1 | I6 | I4 | F1 |   |   |
| G | I1 | I6 | I4 | F1 |   |   |
|   |   | I2 | I4 | F1 |   |   |
| H |   | I2 | I4 | F1 |   |   |
| I |   | I2 | I4 | F1 |   |   |
| J | I5 | I2 | I4 | F1 |   |   |

FIG. 8B

REGISTER PRESPILL PHASE IN A COMPILER

FIELD OF THE INVENTION

This invention relates generally to compilation, and more specifically to a register prespill phase in a compiler.

BACKGROUND

Compilers are programs that compile a source program (such as source code or byte code) into a target program for a target computing device so that the target computing device is able to understand and execute the target program. FIG. 1 illustrates front end and back end phases of a typical compiler. As illustrated, typical front end phases include lexical analysis, syntax analysis, semantic analysis, and intermediate code generation. Also as illustrated, back end phases typically include optional machine-independent code optimization performed on an intermediate representation, target computing device code generation, and optional machine-dependent code optimization performed on the target computing device specific code. FIG. 2 illustrates subphases performed in typical back end code generation. As illustrated, typical subphases include instruction selection, data-flow analysis, optional global and/or local early instruction scheduling (instruction scheduling performed before register allocation), register allocation, late instruction scheduling (instruction scheduling performed after register allocation), and object file creation.

Typically, intermediate representations store data in virtual registers. During register allocation, these virtual registers are mapped to the physical registers of the target computing device that will actually store the data represented by the virtual registers while the target computing device executes the code. However, the number of live virtual registers is not constrained to the number of physical registers that a target computing device actually includes. Data-flow analysis is used to compute the liveness of the virtual registers at each program point. The register pressure at a program point is just the number of live virtual registers. The register pressure is excessive when the number of live virtual registers exceeds the number of physical registers on the target computing device. In addition to mapping virtual registers to physical registers, register allocation typically spills virtual registers (stores virtual registers in memory and reloads them from memory when needed) when register pressure is excessive such that all virtual registers are either stored in memory or physical registers.

Because excessive register pressure is typically not handled until register allocation, early instruction schedulers generally have to consider and attempt to minimize register pressure. This reduces the effectiveness of early instruction schedulers to focus on minimizing stalls in execution. Further, because instructions for spilling the virtual registers are not typically inserted until register allocation, early instruction schedulers cannot optimize those later inserted instructions. Late instruction scheduling typically cannot optimize the instructions for spilling the virtual registers either, as the mapping of virtual registers to physical registers greatly restrict the ability of late instruction schedulers to move instructions within the code of a program.

SUMMARY

In one or more implementations, a compiler configured in accordance with the present disclosure performs a prespill phase when compiling the code of a program for a target computing device. The compiler identifies one or more points of excessive register pressure in the code, locations where the number of live virtual registers exceeds the number of physical registers of the target computing device, and reduces the register pressure at those points prior to performing register allocation. The compiler reduces the register pressure during the prespill phase by selecting a group of candidate virtual registers, choosing virtual registers to prespill from the group of candidates, and inserting spill and reload instructions in the code to prespill the chosen registers.

Depending on the implementation of the compiler and/or the target computing device, the compiler may reduce the register pressure such that the live virtual registers only exceed the physical registers by a particular number, the live virtual registers equal the physical registers, or the physical registers exceed the live virtual registers by a particular number. The compiler may then perform one or more early and/or late instruction scheduling phases, including global and/or local instruction scheduling, to optimize the placement of the spill and reload instructions in the code.

In various implementations, the compiler may select the group of candidate virtual registers by comparing one or more prespill metrics assigned to the virtual registers and selecting the virtual registers based on the comparison. In other implementations, the compiler may select the group of candidate virtual registers by selecting all virtual registers.

In various implementations, the compiler may choose virtual registers to prespill from the group of candidates by choosing the entire group of candidates. In other implementations, the compiler may compare one or more prespill metrics assigned to the candidates and choose the virtual registers to prespill based on the comparison.

By reducing excessive register pressure prior to register allocation, instruction scheduling phases can be utilized to minimize stalls rather than minimizing register pressure. Further, register allocation is simplified and the code compiled for the target machine will execute faster and more efficiently.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The present disclosure may be better understood, and its numerous features made apparent to those skilled in the art by referencing the accompanying drawings.

FIG. 8A is a chart illustrating the mapping of virtual registers to physical registers of the computing device of FIG. 7 for the code of the program illustrated in FIG. 6I;

FIG. 8B is a chart illustrating the mapping of virtual registers to physical registers of the computing device of FIG. 7 for the code of the program illustrated in FIGS. 6J and 6K.

DETAILED DESCRIPTION

The present disclosure describes systems and methods that perform a register prespill phase in a compiler. Prior to performing register allocation, a compiler analyzes the code of a program to determine where register pressure is excessive, i.e. where live virtual registers exceed physical registers of the target machine. The compiler selects virtual registers as prespilling candidates and chooses virtual registers to prespill from the candidates. The compiler then prespills the chosen candidates to reduce excessive register pressure.

As the prespill phase reduces excessive register pressure, instruction scheduling phases are free to focus on minimizing stalls rather than considering and minimizing register pressure. Further, the instruction scheduling phases can be utilized to optimize spill and reload instructions inserted in the code by the prespill phase. This results in more optimal placement of spill and reload instructions than those that would be selected by a register allocation phase or would be possible to a late instruction scheduler after register allocation. Also because the prespill phase reduces excessive register pressure, register allocation is simplified as register allocation thusly does not have to spill virtual registers to deal with the excessive register pressure. As a result, the code compiled for the target machine will execute faster and more efficiently.

Figure 1:
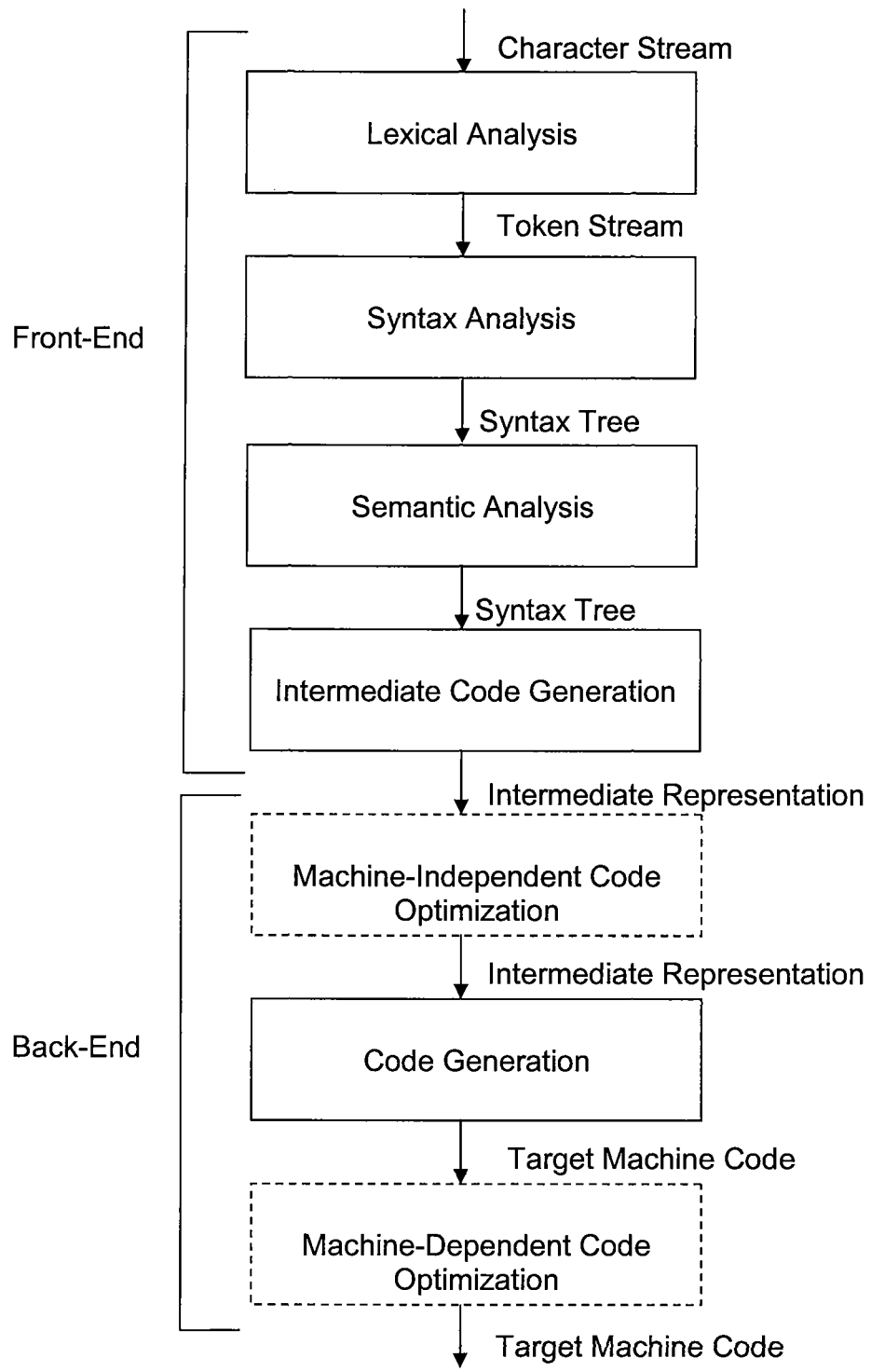
FIG. 1 is a flowchart illustrating phases of a conventional compiler.
Figure 2:
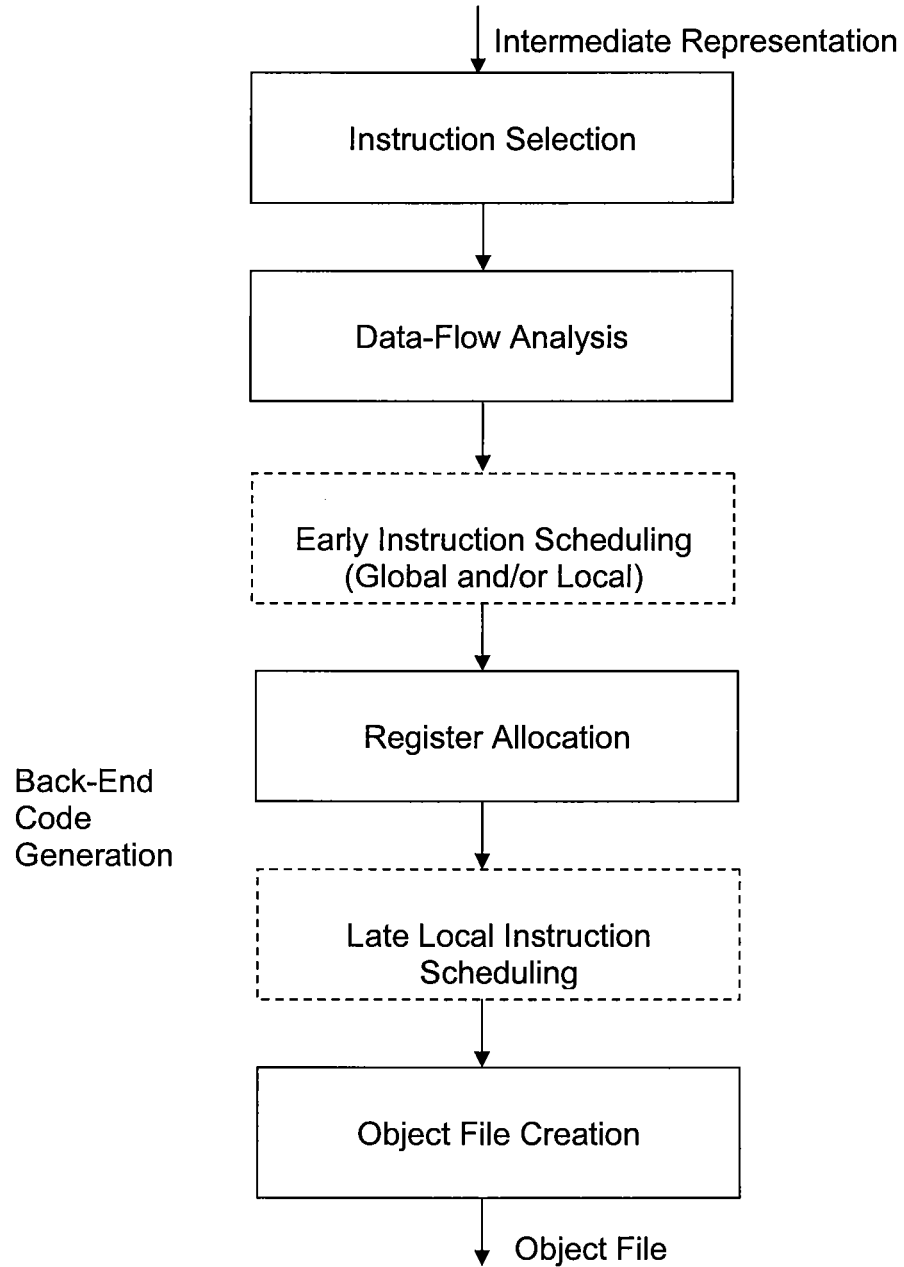
FIG. 2 is a flowchart illustrating subphases of a back-end code generation phase of a conventional compiler.
Figure 3:
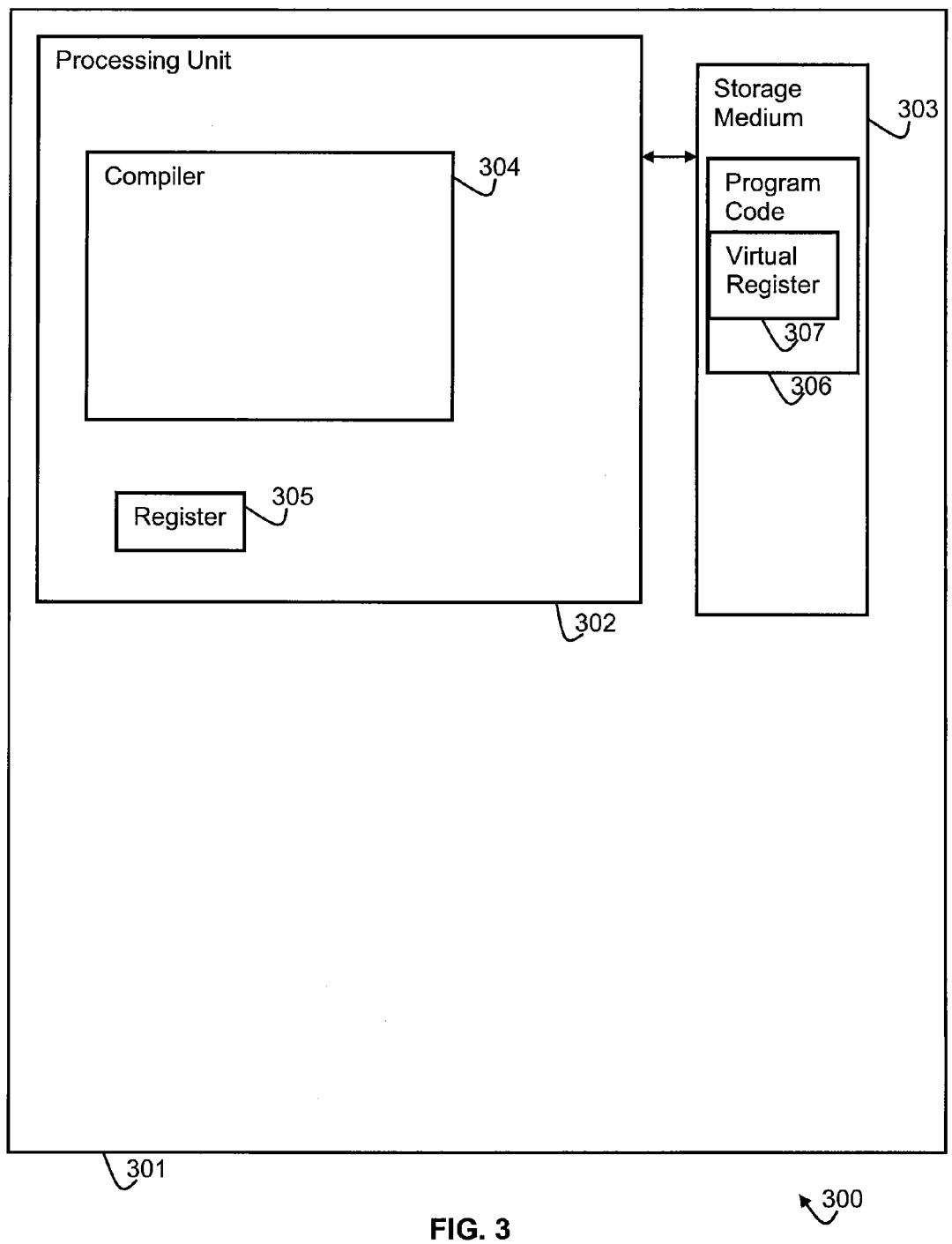
FIG. 3 is a block diagram illustrating a system 300 for performing a register prespill phase in a compiler, in accordance with an embodiment of the present disclosure.

FIG. 3 illustrates a system 300 for performing a register prespill phase in a compiler, in accordance with an embodiment of the present disclosure. The system 300 involves a computing device 301 that includes a processing unit 302, one or more registers 305, and a tangible machine-readable storage media 303. The tangible machine-readable storage media 303 stores code (such as source code or byte code) for one or more programs 306. The code for the one or more programs 306 includes one or more virtual registers 307 which are used to store data in the one or more programs. The processing unit 302 executes instructions stored in the storage medium 303 to implement a compiler 304.

The compiler 304 compiles the code for the one or more programs 306 for a target machine (the machine for which the compiler 304 is compiling the code for the one or more programs 306), such as the computing device 301. The compiler 304 performs a prespill phase to find one or more points of excessive register pressure in the code for the one or more programs 306 and at least reduce the excessive register pressure at those points prior to performing register allocation. The points of excessive register pressure are locations where the live virtual registers in the code for the one or more programs 306 exceed the physical registers (such as the one or more registers 305) of the target machine.

As illustrated, the one or more registers 305 are included in the processing unit 302. However, the one or more registers 305 may be any kind of registers including on-chip registers and/or off-chip registers. The one or more registers 305 may be registers of a particular type, such as integer registers and/or floating point registers, and may include a bit length such as 32 bits, 64 bits, or 128 bits.

While the system 300 has been described as including computing device 301, a single processing unit 302, and a single storage medium 303, it will be understood that system 300 is illustrative and that multiple computing devices 301 (which may be communicably coupled), multiple processing units 302, and/or multiple storage media 303 may be utilized without departing from the scope of the present disclosure. Further, although the compiler 304 has been described as compiling the code for the one or more programs 306 for the computing device 301, it is understood that the compiler 304 may compile the code for the one or more programs 306 for a target machine other than the computing device 301 that the compiler 304 executes upon, such as the computing device 701 illustrated in FIG. 7.

Referring again to FIG. 3, the tangible machine-readable storage medium 303 may include, but is not limited to, magnetic storage media (e.g., floppy diskette), optical storage media (e.g., CD-ROM); magneto-optical storage media, read only memory, random access memory, erasable programmable memory (e.g., EPROM and EEPROM), flash memory, and other types of memory and media suitable for storing electronic information. The computing device 301 may also include (not shown) one or more input and/or output devices (including, but not limited to displays, keyboards, mice, printers, scanners, and so forth), one or more buses (including, but not limited to, universal serial bus, small computer system interface, and so forth), and/or one or more communication components (including, but not limited to, modems, Ethernet adapters, wireless Ethernet adapters, and so forth).

Figure 4:
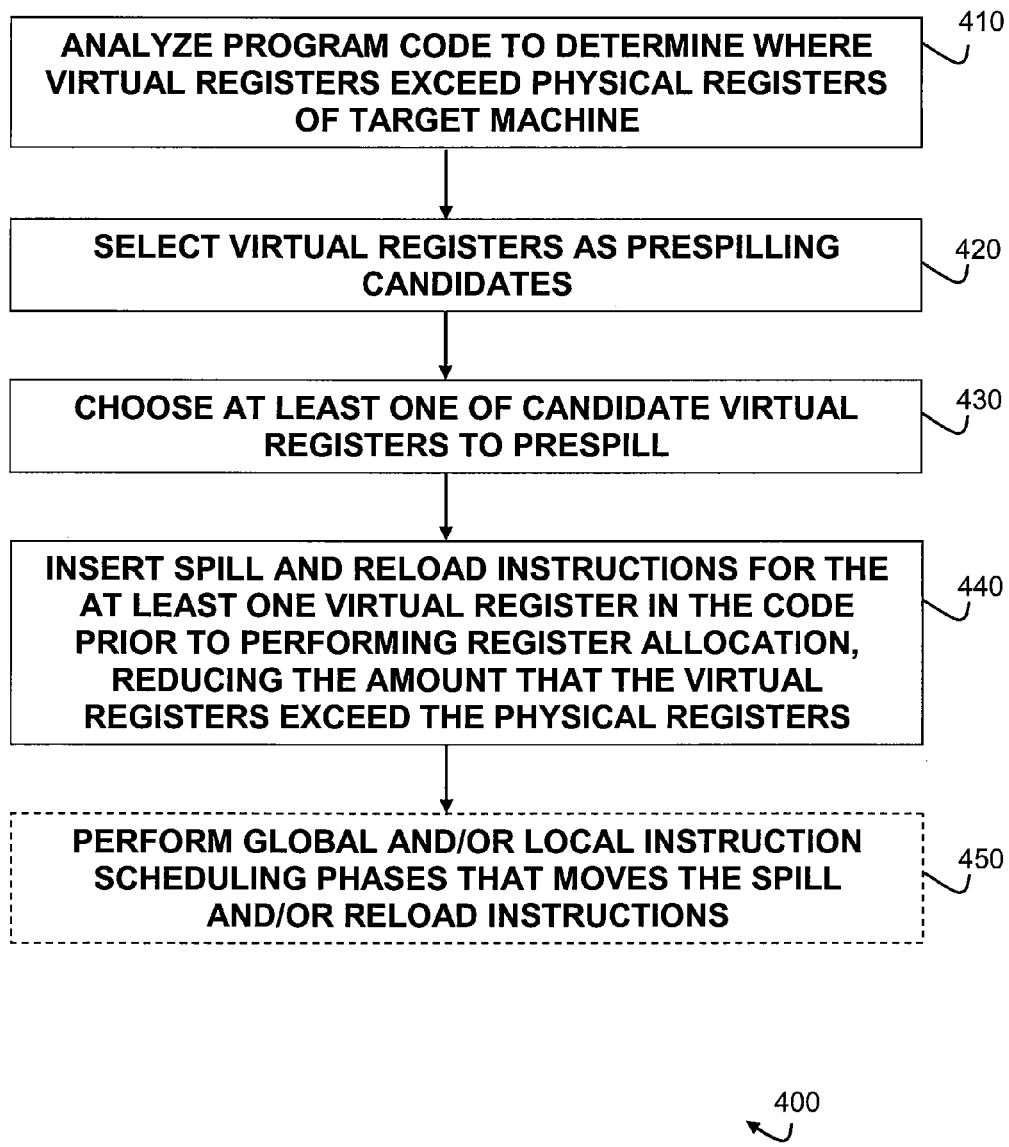
FIG. 4 is a method diagram illustrating a method for performing a register prespill phase in a compiler, which may be performed by the system of FIG. 3, in accordance with an embodiment of the present disclosure.

FIG. 4 illustrates a method 400 for performing a register prespill phase in a compiler, which may be performed by the system 300, in accordance with an embodiment of the present disclosure. The method 400 may comprise a computer-implemented method. The computer-implemented method may be performed by a processing unit, such as the processing unit 302, executing one or more sets of instructions included in a computer program product stored in the tangible machine-readable medium 303.

In a first operation 410, the compiler 304 analyzes the code of a program to determine at least one point in the code where the number of live virtual registers in the code exceeds the number of physical registers of target machine. In some implementations, the compiler 304 may analyze each type of live virtual register and physical register separately. For example, the compiler 304 may determine whether the number of live integer virtual registers exceeds the number of integer physical registers and/or whether the number of live floating point virtual registers exceeds the number of floating point physical registers. In other implementations, the compiler 304 may determine whether the number of all live virtual registers exceeds the number of all physical registers.

As part of analyzing the code, the compiler 304 may perform data-flow analysis on the code and analyze the results of the data-flow analysis. For example, the compiler 304 may perform liveness analysis of virtual registers, i.e. whether or not the virtual registers are in use, throughout the code. By way of another example, the compiler 304 may analyze the code to determine information about the code and/or the virtual registers such as the number of instructions in the code that reference (i.e. the stored value is obtained without alteration) each register, the number of times each register is redefined (i.e. value stored in that register is altered) in the code, and/or the execution frequency of various points in the code.

The code may be divided up into a plurality of basic blocks, each basic block including one or more instructions between a branch or jump to another basic block, and the at least one point may be a basic block where the number of virtual registers that are live into the beginning of that basic block exceed the number of physical registers of the target machine.

In some implementations, the compiler 304 may ignore a point in the code where the number of live virtual registers in the code exceeds the number of physical registers of target machine if the execution frequency of the point in the code does not meet and/or exceed an execution frequency threshold. For example, based on data-flow analysis, the compiler 304 may estimate that a particular point of code will likely only execute once whereas the execution frequency threshold may be five executions. Thus, even if the number of live virtual registers in the code exceeds the number of physical registers of target machine at the particular point in code, the execution frequency at the particular point does not exceed the execution frequency threshold and the compiler 304 will ignore that particular point in the code.

In some implementations, the compiler 304 may analyze various points in the code of a program in an order based on the execution frequency of the various points. For example, based on control-flow analysis or based on profile-feedback data, the compiler 304 may estimate that a particular point of code will likely execute more often than other points in the code and thusly analyze the particular point in the code before, or instead of, the other points in the code.

In a second operation 420, the compiler 304 selects virtual registers as prespilling candidates. In selecting virtual registers as prespilling candidates, the compiler 304 may discard certain virtual registers. By way of example, the compiler 304 may discard virtual registers that are of a type other than the type of live virtual registers that exceed the same type of physical registers for the at least one point in the code. By way of another example, the compiler 304 may discard virtual registers that are referenced at a point in the code where the number of live virtual registers exceeds the number of physical registers. In particular, one heuristic is to avoid spills and reloads of a virtual register in the same basic block where that virtual register is referenced and in the same basic block that has excessive register pressure because the spills and reloads will be too close to the references.

In some implementations, the compiler 304 may select a number of virtual registers as prespilling candidates based on the amount that the number of live virtual registers exceeds the number of physical registers. The compiler 304 may select the number to equal, exceed by a certain amount (such as two more), or be less (such as one less) than the amount that that the number of live virtual registers exceeds the number of physical registers. As part of selecting the virtual registers, the compiler 304 may determine spill and/or load locations for one or more of the virtual registers. The compiler 304 may determine a spill location for one or more of the virtual registers by locating the previous point in the code where the respective virtual register is defined or redefined. The compiler 304 may determine a reload location for one or more of the virtual registers by locating the subsequent point in the code where the respective virtual register is next referenced.

The compiler 304 may select virtual registers as prespilling candidates by calculating one or more prespill metrics for the virtual registers, assigning the one or more prespill metrics to the virtual registers, and comparing the one or more prespill metrics of the virtual registers. The one or more prespill metrics may include, but are not limited to, whether the virtual register has been selected as a prespilling candidate for another point in the code, whether the virtual register has been chosen to prespill for another point in the code, the type of the virtual register, the bit length of the virtual register, the number of instructions that reference the virtual register, the number of times that the virtual register is redefined, the number of instructions to be inserted to spill the virtual register, the number of instructions to be inserted to reload the virtual register, the sum of the execution frequencies of the instructions to be inserted to spill and/or load the virtual register, the execution frequency of a point in the code where a spill instruction would be inserted to spill the virtual register, and/or the execution frequency of a point in the code where a reload instruction would be inserted to reload the virtual register.

The compiler 304 may select virtual registers as prespilling candidates by comparing the virtual registers based on a first prespill metric, such as the sum of the execution frequencies of the instructions to be inserted to spill and/or load the respective virtual register. If the first prespill metric for two or more virtual registers is equivalent, the compiler 304 may select among those virtual registers by comparing additional prespill metrics for those virtual registers until one is selected. Alternatively, the compiler 304 may rank the virtual registers based on multiple prespill metrics and select the virtual registers based on the ranking.

In other implementations, the compiler 304 may select all virtual registers, or all virtual registers of the type that exceeds the type of physical registers, as prespilling candidates.

In a third operation 430, the compiler 304 chooses at least one of the candidate virtual registers to prespill. In some implementations, the compiler 304 may choose all candidate virtual registers to prespill.

In other implementations, the compiler 304 may choose a portion of the candidate virtual registers to prespill. In choosing candidate virtual registers to prespill, the compiler 304 may discard certain virtual registers. By way of example, the compiler 304 may discard virtual registers that are of a type other than the type of live virtual registers that exceed the same type of physical registers for the at least one point in the code. By way of another example, the compiler 304 may discard virtual registers that are referenced at a point in the code where the number of live virtual registers exceeds the number of physical registers. In particular, one heuristic is to avoid spills and reloads of a virtual register in the same basic block where that virtual register is referenced and in the same basic block that has excessive register pressure because the spills and reloads will be too close to the references.

In some of these implementations, the compiler 304 may choose a number of candidate virtual registers to prespill based on the amount that the number of live virtual registers exceeds the number of physical registers. The compiler 304 may choose the number to equal, exceed by a certain amount (such as two more), or be less (such as one less) than the amount that that the number of live virtual registers exceeds the number of physical registers. As part of choosing the candidate virtual registers, the compiler 304 may determine spill and/or load locations for one or more of the candidate virtual registers.

The compiler 304 may choose candidate virtual registers to prespill by calculating one or more prespill metrics for the candidate virtual registers, assigning the one or more prespill metrics to the candidate virtual registers, and comparing the one or more prespill metrics of the candidate virtual registers. The one or more prespill metrics may include, but are not limited to, whether the virtual register has been selected as a prespilling candidate for another point in the code, whether the virtual register has been chosen to prespill for another point in the code, the type of the candidate virtual register, the bit length of the candidate virtual register, the number of instructions that reference the candidate virtual register, the number of times that the candidate virtual register is redefined, the number of instructions to be inserted to spill the candidate virtual register, the number of instructions to be inserted to reload the candidate virtual register, the sum of the execution frequencies of the instructions to be inserted to spill and/or load the virtual register, the execution frequency of a point in the code where a spill instruction would be inserted to spill the candidate virtual register, and/or the execution frequency of a point in the code where a reload instruction would be inserted to reload the candidate virtual register.

The compiler 304 may choose candidate virtual registers to prespill by comparing the candidate virtual registers based on a first prespill metric, such as the number of instructions to be inserted to spill and/or reload the respective candidate virtual registers. If the first prespill metric for two or more candidate virtual registers is equivalent, the compiler 304 may choose among those candidate virtual registers by comparing additional prespill metrics for those candidate virtual registers until one is chosen. Alternatively, the compiler 304 may rank the candidate virtual registers based on multiple prespill metrics and choose the candidate virtual registers based on the ranking.

In a fourth operation 440, the compiler 304 inserts spill and reload instructions in the code for the chosen candidate virtual registers prior to performing register allocation, reducing the amount that the virtual registers exceed the physical registers for the at least one point in the code. In some implementations, the compiler 304 may insert the spill and reload instruction prior to performing an instruction scheduling phase.

The method 400 may include a fifth operation 450. In the fifth operation 450, the compiler 304 performs one or more instruction scheduling phases on the code that moves the spill and/or load instructions. The one or more instruction scheduling phases may be one or more global scheduling phases, which optimize the code by moving instructions between basic blocks, and/or one or more local scheduling phases, which optimize the code by moving instructions within basic blocks. The one or more instruction scheduling phases may also be one or more early instruction scheduling phases, i.e. instruction scheduling phases performed prior to register allocation, and/or one or more late instruction scheduling phases, i.e. instruction scheduling phases performed subsequent to register allocation.

The compiler 304 may perform the one or more instruction scheduling phases on the code that moves the spill and/or load instructions in order to optimize the placement of the spill and/or load instructions in the code. For example, if the compiler 304 inserted the spill and/or load instructions in a frequently executed basic block in the code but the spill and/or load instructions can be moved to a less frequently executed basic block without causing errors, the compiler 304 may perform the one or more scheduling phases on the code to move the spill and/or load instructions to the less frequently executed basic block. By way of another example, if the compiler 304 inserted the spill and/or load instructions at a location within a basic block in the code that will cause delay (such as where a reload instruction for a virtual register is inserted directly preceding a reference to that virtual register) but the spill and/or load instructions can be moved to another location within the basic block without causing errors (such moving a reload instruction for a virtual register from directly preceding a reference to that virtual register to a number of instructions preceding that reference), the compiler 304 may perform the one or more scheduling phases on the code to move the spill and/or load instructions to the other location.

Although the method 400 has been described above with respect to at least one point in the code, it is understood that the method 400 may identify multiple points in the code where the number of live virtual registers exceeds the number of physical registers and prespill virtual registers for the multiple points in the code to reduce the amount that the number of live virtual registers exceeds the number of physical registers for the multiple points in the code without departing from the scope of the present disclosure. In some implementations, the compiler 304 may select, choose, and spill virtual registers for some or all of the multiple points in the code at the same time. In other implementations, the compiler 304 may select, choose, and spill virtual registers for each of the multiple points in the code separately, such as in order by execution frequency of the multiple points in the code.

Figure 5:
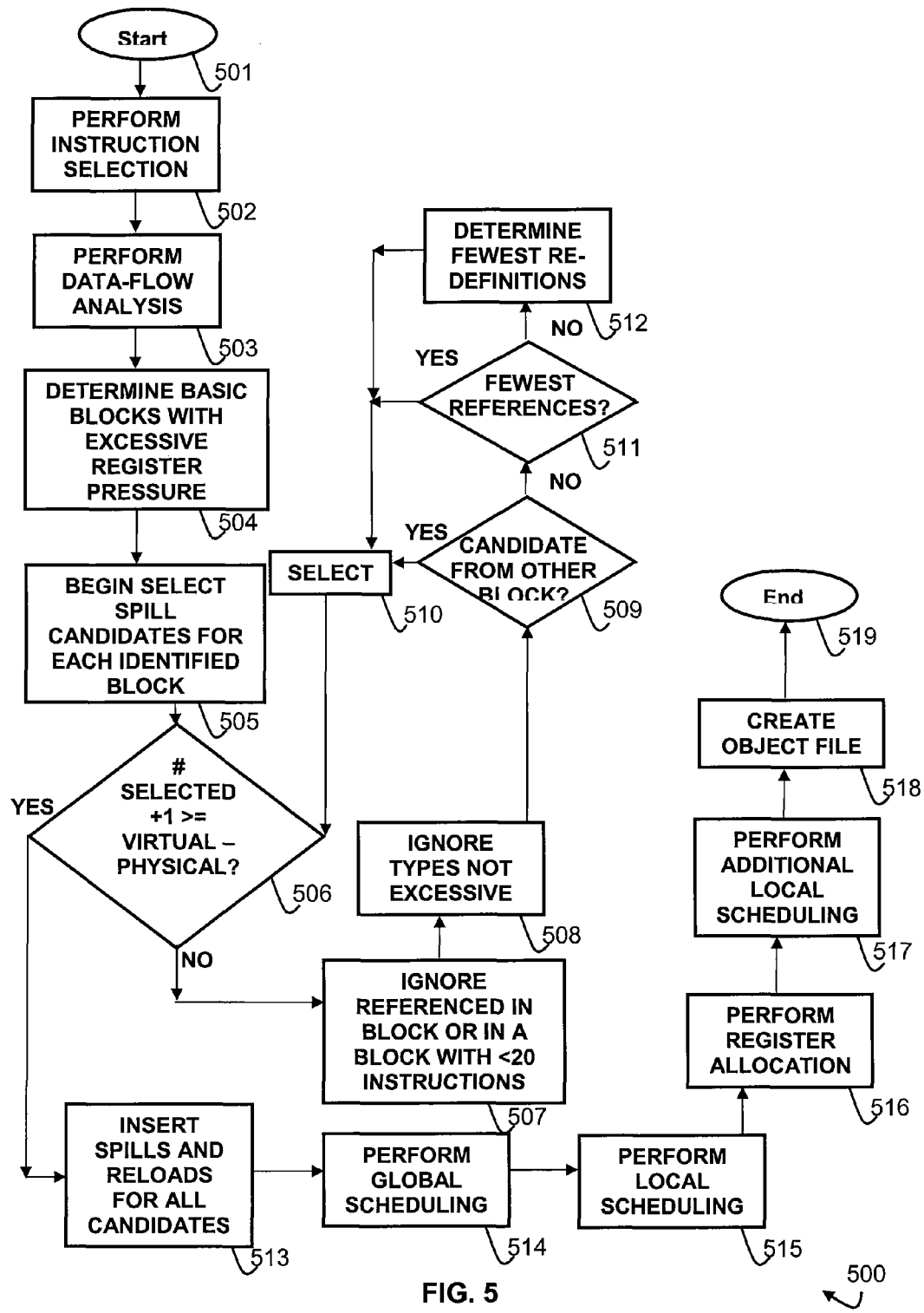
FIG. 5 is a flow chart illustrating an example flow of an implementation of the method of FIG. 4, in accordance with the present disclosure.

FIG. 5 illustrates the flow 500 of an example performance of method 400 by an example implementation of the compiler 304. The flow starts at block 501 and proceeds to block 502. At block 502, the compiler 304 performs instruction selection on the code of a program and the flow proceeds to block 503. At block 503, the compiler 304 performs data-flow analysis on the code and the flow proceeds to block 504. At block 504, the compiler 304 determines basic blocks of the code that have excessive register pressure, i.e. where the number of live virtual registers exceeds the number of physical registers, and the flow proceeds to block 505.

At block 505, the compiler 304 begins selecting spill candidates for each identified block. The compiler 304 selects spill candidates for each identified block by performing blocks 506 through 512. Although blocks 506 through 512 are illustrated as a single flow of operations for clarity, it is understood that in this example the compiler 304 also performs the flow of blocks 506 through 512 for all of the basic blocks of code identified as having excessive register pressure. Blocks 505 through 512 represent a set of heuristics for selecting the best virtual registers to prespill for this particular implementation of the compiler 304. It is understood that heuristics may be used as an exhaustive enumeration may consume excessive compile-time. It is also understood that different heuristics and/or a different order of heuristics may be better suited for particular compiler implementations and/or particular target machines.

At block 506, the compiler 304 determines whether the number of virtual registers selected as prespilling candidates is greater than or equal to the one less than the amount that the number of live virtual registers exceeds the physical registers. Thus, in this example, the compiler 304 is selecting enough candidate virtual registers for prespilling to reduce the register pressure so that the live virtual registers exceed the physical registers by no more than one. It is understood that selecting enough candidates so that the live virtual registers exceed the virtual registers by no more than one is a heuristic that provides the best performance for this particular implementation of the compiler 304. In other implementations of the compiler 304, selecting enough candidates such that the live virtual registers equal the physical registers or that the physical registers exceed the live virtual registers by at least one. In this implementation, where the compiler 304 is selecting enough candidate virtual registers for prespilling to reduce the register pressure so that the live virtual registers exceed the physical registers by no more than one, the compiler 304 may later utilize the register allocation phase to reduce this excessive register pressure of one. If the number of virtual registers selected as prespilling candidates is greater than or equal to the one less than the amount that the number of live virtual registers exceeds the physical registers, the flow proceeds to block 513. If the number of virtual registers selected as prespilling candidates is not greater than or equal to the one less than the amount that the number of live virtual registers exceeds the physical registers, the flow proceeds to block 507.

At block 507, the compiler 304 discards all virtual registers that are referenced in the basic block where the register pressure is excessive. Such virtual registers would require insertion of spill or reload instructions in high pressure areas of the program, so the compiler 304 avoids this issue by not select them as candidates. For similar reasons, at block 507, the compiler 304 also discards all virtual registers that are referenced in a basic block with fewer than twenty instructions. The flow then proceeds to block 508.

At block 508, the compiler 304 discards all virtual registers that are not of the type that is excessive. Such references cannot be prespilled to reduce register pressure because they are not that type of register that more of is needed, so the compiler 304 does not select them as candidates. The flow then proceeds to block 509.

At block 509, the compiler 304 determines whether one of the multiple virtual registers with the same lowest cost has already been selected as a candidate for prespilling for another basic block where register pressure is excessive. If one of the multiple virtual registers with the same lowest cost has already been selected as a candidate for prespilling for another basic block where register pressure is excessive, the flow proceeds to block 510 where the compiler 304 selects that virtual register as a candidate for prespilling and proceeding to block 506. If one of the multiple virtual registers with the same lowest cost has not already been selected as a candidate for prespilling for another basic block where register pressure is excessive, the flow proceeds to block 511.

At block 511, the compiler 304 determines whether one of the multiple virtual registers with the same lowest cost has fewer references to it than the others. If one of the multiple virtual registers with the same lowest cost has fewer references to it than the others, the flow proceeds to block 510 where the compiler 304 selects that virtual register as a candidate for prespilling and proceeding to block 506. If one of the multiple virtual registers with the same lowest cost does not have fewer references to it than the others, the flow proceeds to block 512. At block 512, the compiler 304 determines which of the virtual registers with the same lowest cost has the fewest redefinitions. The flow then proceeds to block 510 where the compiler 304 selects that virtual register as a candidate for prespilling and proceeding to block 506.

At block 513, the compiler 304 inserts the spill and reload instructions for each of the selected candidate virtual registers. In this implementation, the compiler 304 inserts a spill instruction for each of the selected candidate virtual registers immediately after each definition or redefinition of the respective candidate virtual register in the code and inserts a reload instruction for each of the selected candidate virtual registers immediately prior to each reference that is a read of the respective candidate virtual register. Then the flow proceeds to block 514. At block 514, the compiler 304 performs a global scheduling phase, which may optimize the code by moving one or more of the spill and reload instructions between basic blocks of the code, and the flow proceeds to block 515. At block 515, the compiler 304 performs a local scheduling phase, which may optimize the code by moving one or more of the spill and reload instructions within a basic block of the code, and the flow proceeds to block 516.

At block 516, the compiler 304 performs a register allocation phase that assigns which virtual registers will be stored in which specific physical register of the target machine for each point in the code. The register allocation phase may also spill and reload one or more virtual registers if register pressure remains excessive for any point in the code. The flow then proceeds to block 517.

At block 517, the compiler 304 performs a local scheduling phase, which may optimize the code by moving one or more of the spill and reload instructions within a basic block of the code, and the flow proceeds to block 518. At block 518, the compiler 304 creates an object file for the code and the flow proceeds to block 519 and ends.

Figure 6A:
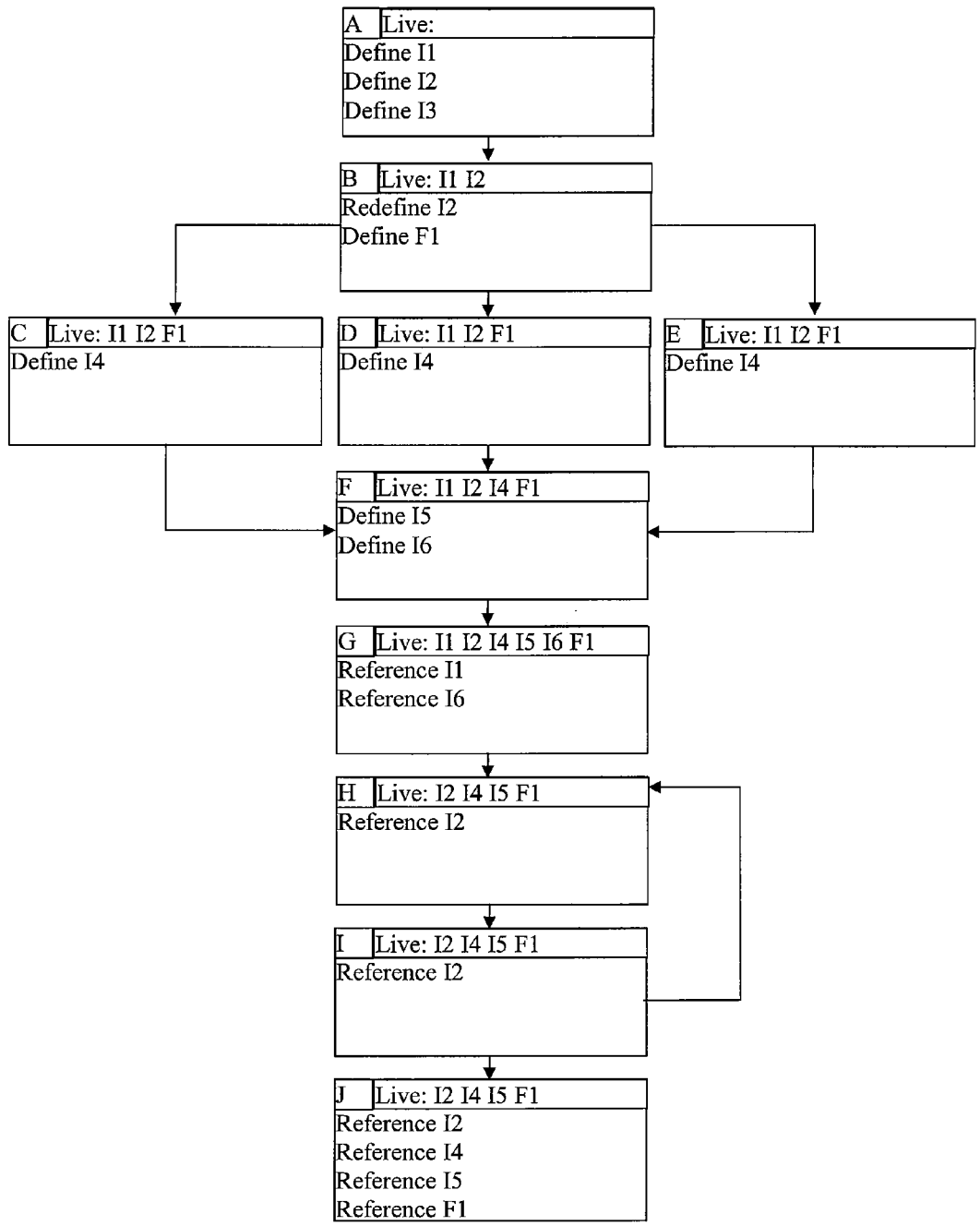
FIG. 6A is a diagram illustrating the execution flow of the code of a program prior to performance of an example implementation of the method of FIG. 4.
Figure 6B:
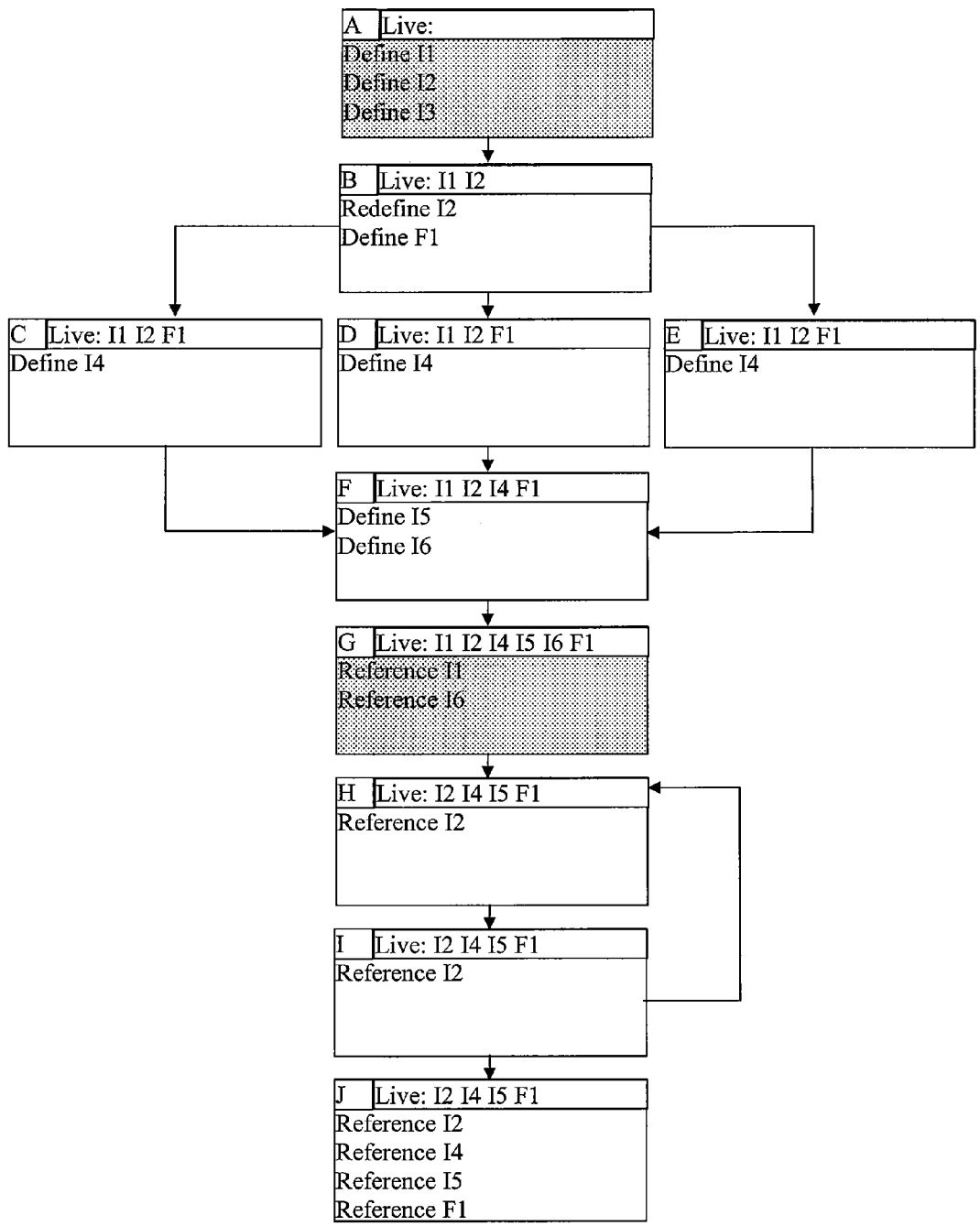
FIG. 6B is a diagram illustrating spill and reload locations for a first virtual register determined during the performance of the example implementation of the method of FIG. 4.
Figure 6C:
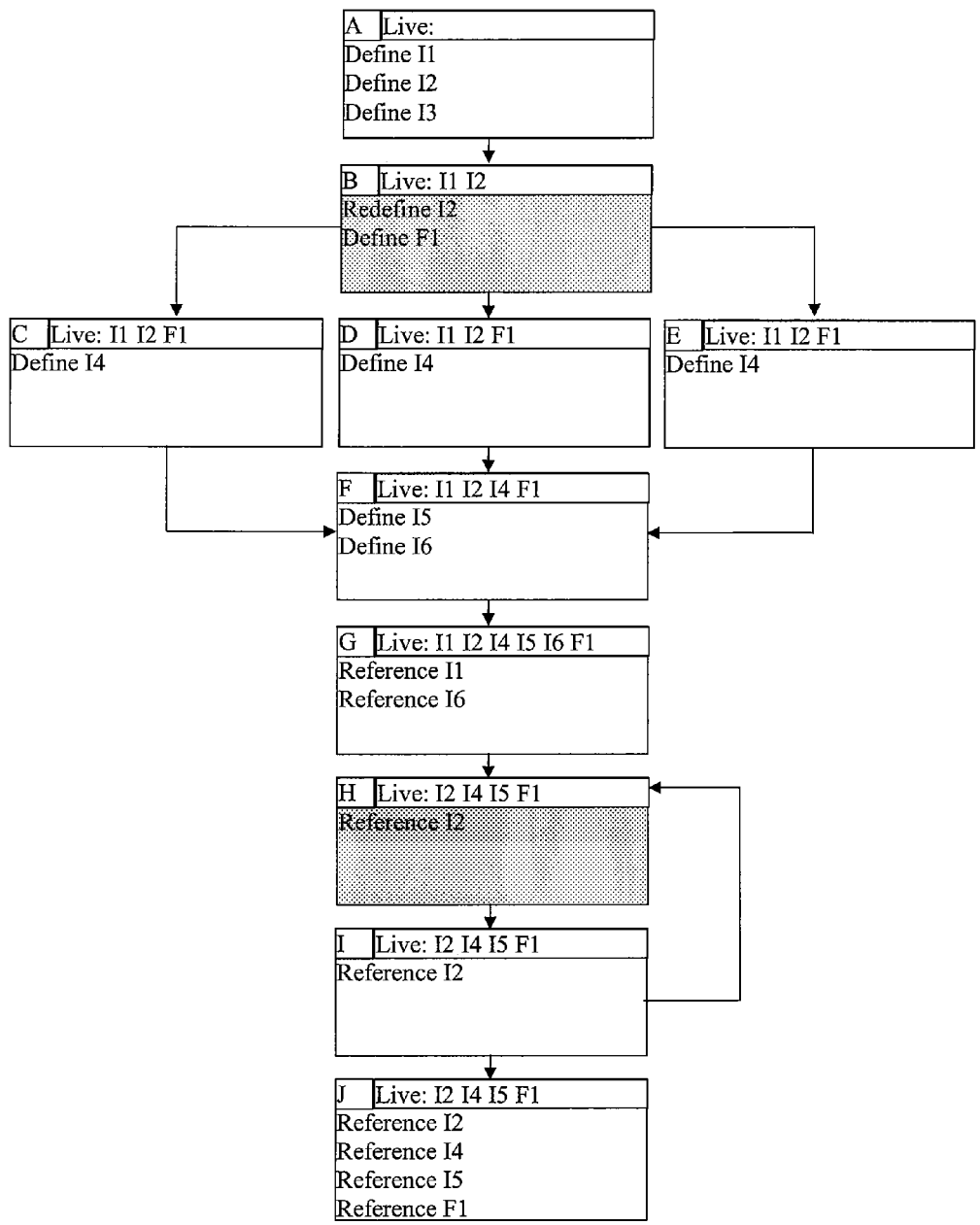
FIG. 6C is a diagram illustrating spill and reload locations for a second virtual register determined during the performance of the example implementation of the method of FIG. 4.
Figure 6D:
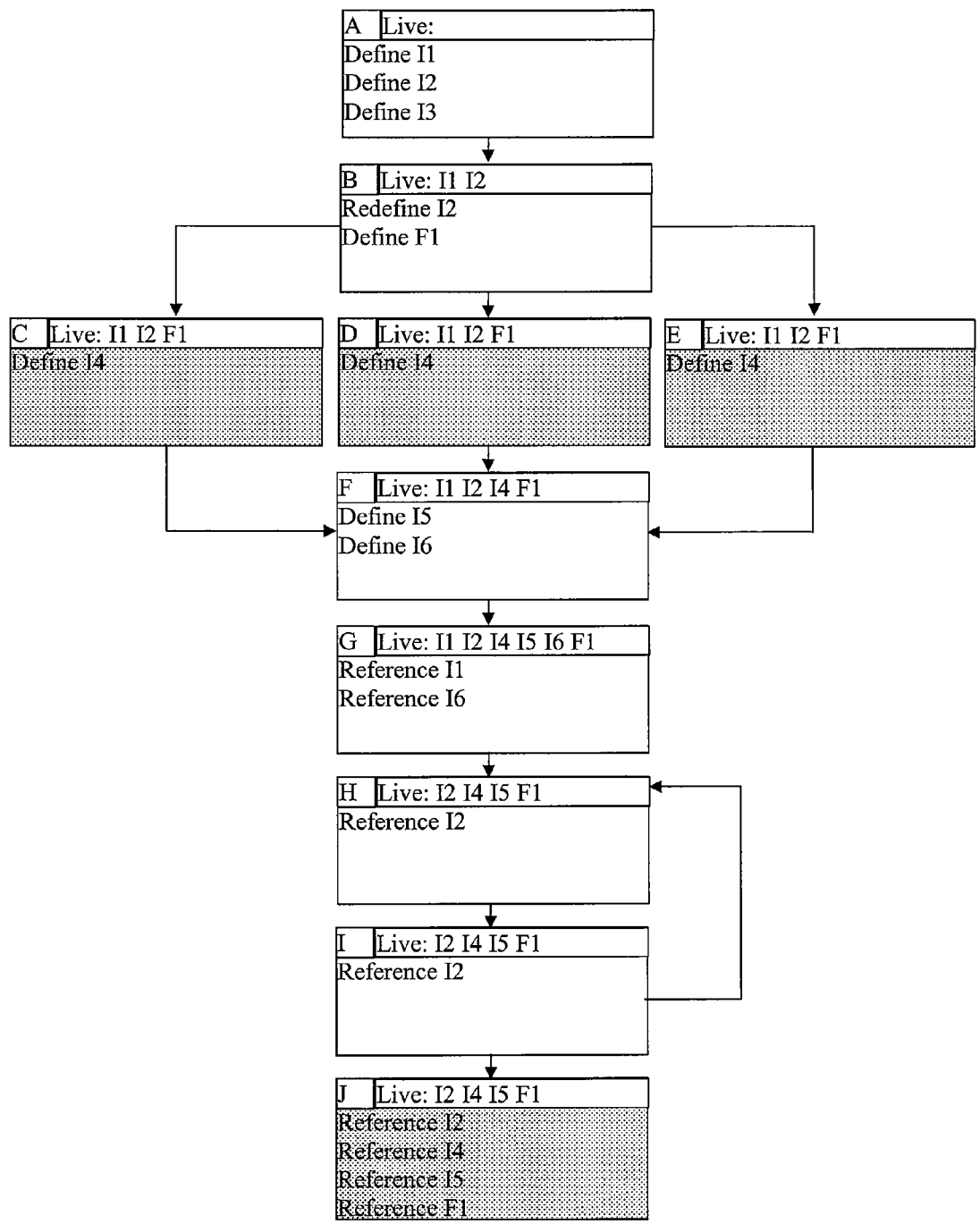
FIG. 6D is a diagram illustrating spill and reload locations for a third virtual register determined during the performance of the example implementation of the method of FIG. 4.
Figure 6E:
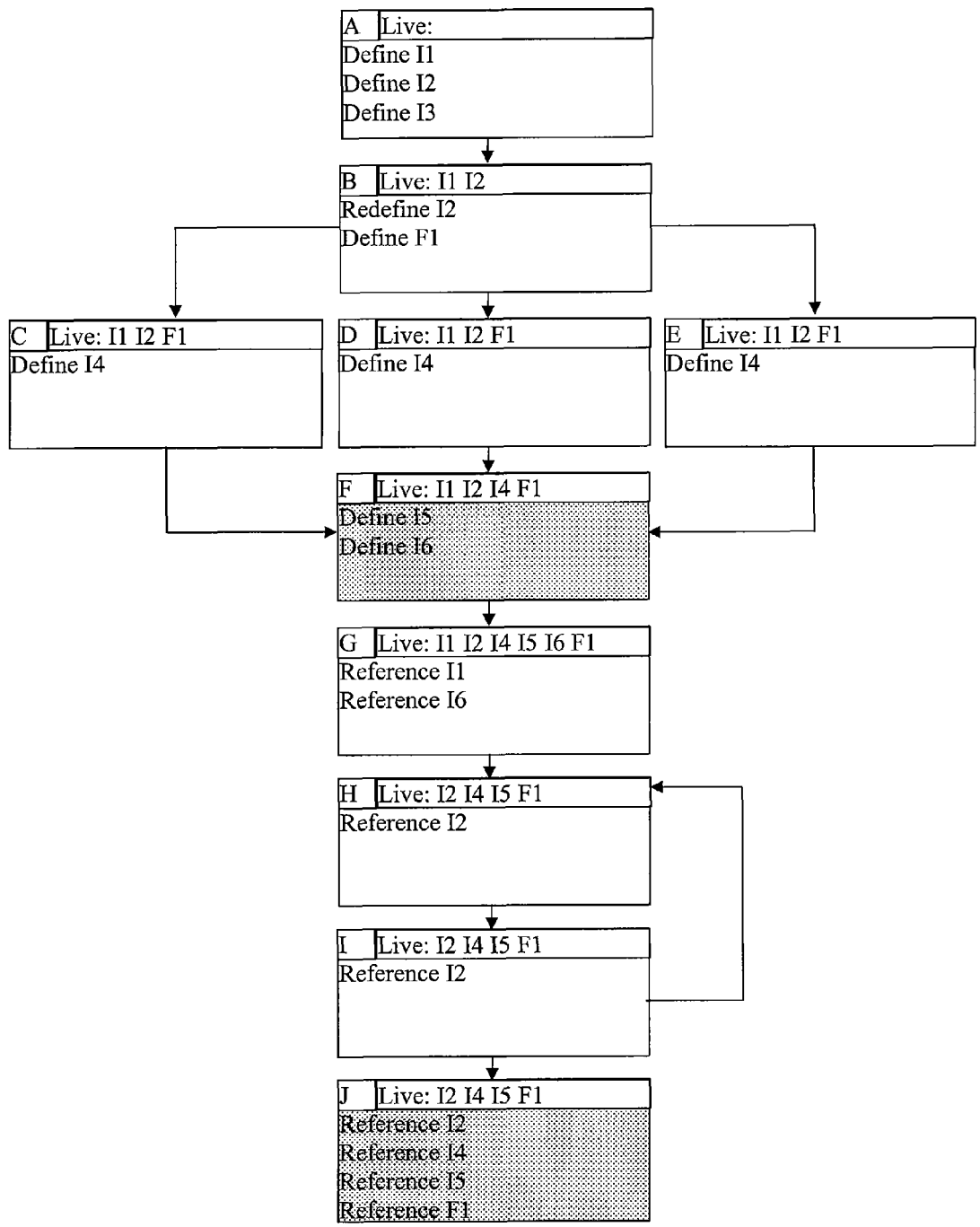
FIG. 6E is a diagram illustrating spill and reload locations for a fourth virtual register determined during the performance of the example implementation of the method of FIG. 4.
Figure 6F:
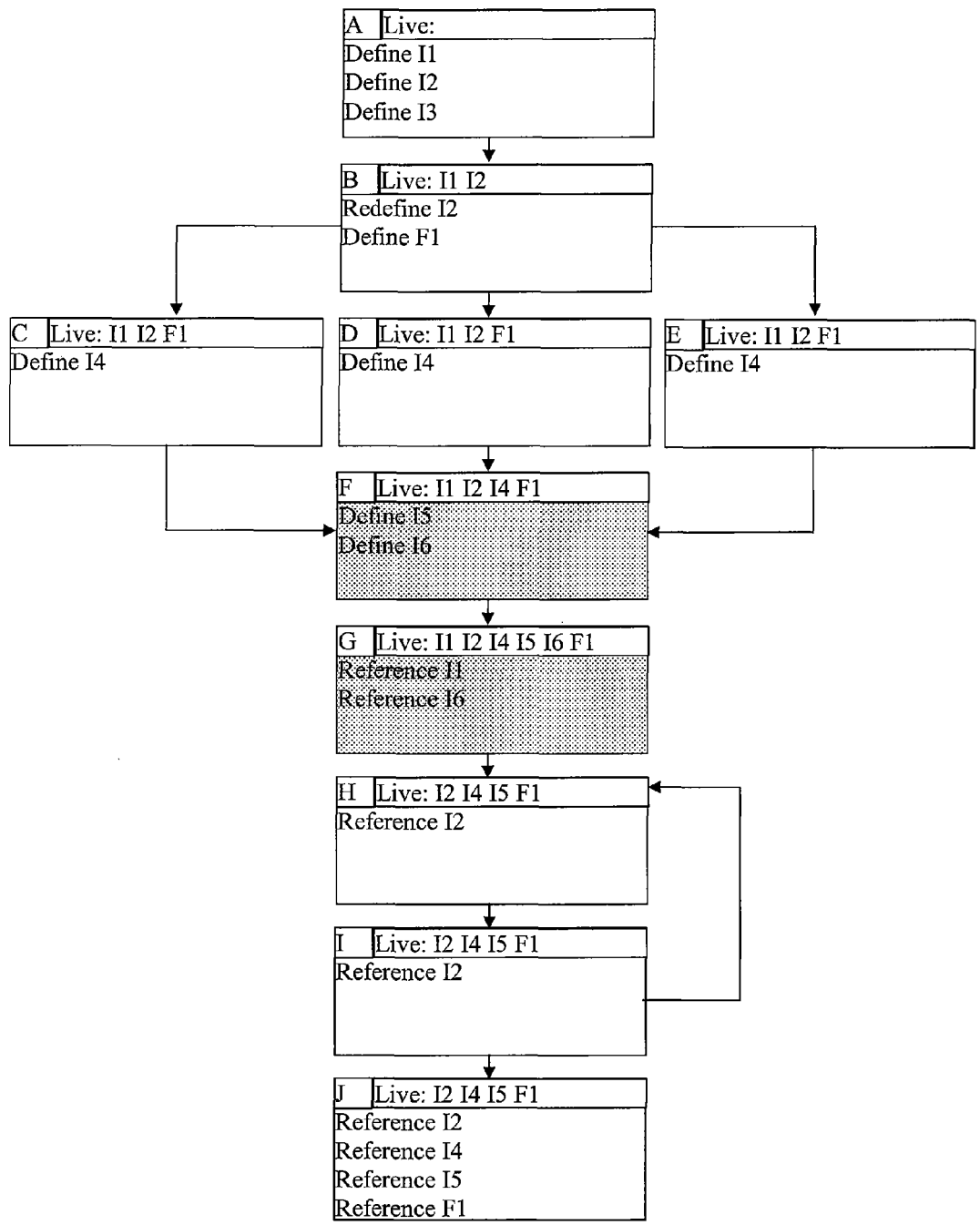
FIG. 6F is a diagram illustrating spill and reload locations for a fifth virtual register determined during the performance of the example implementation of the method of FIG. 4.
Figure 6G:
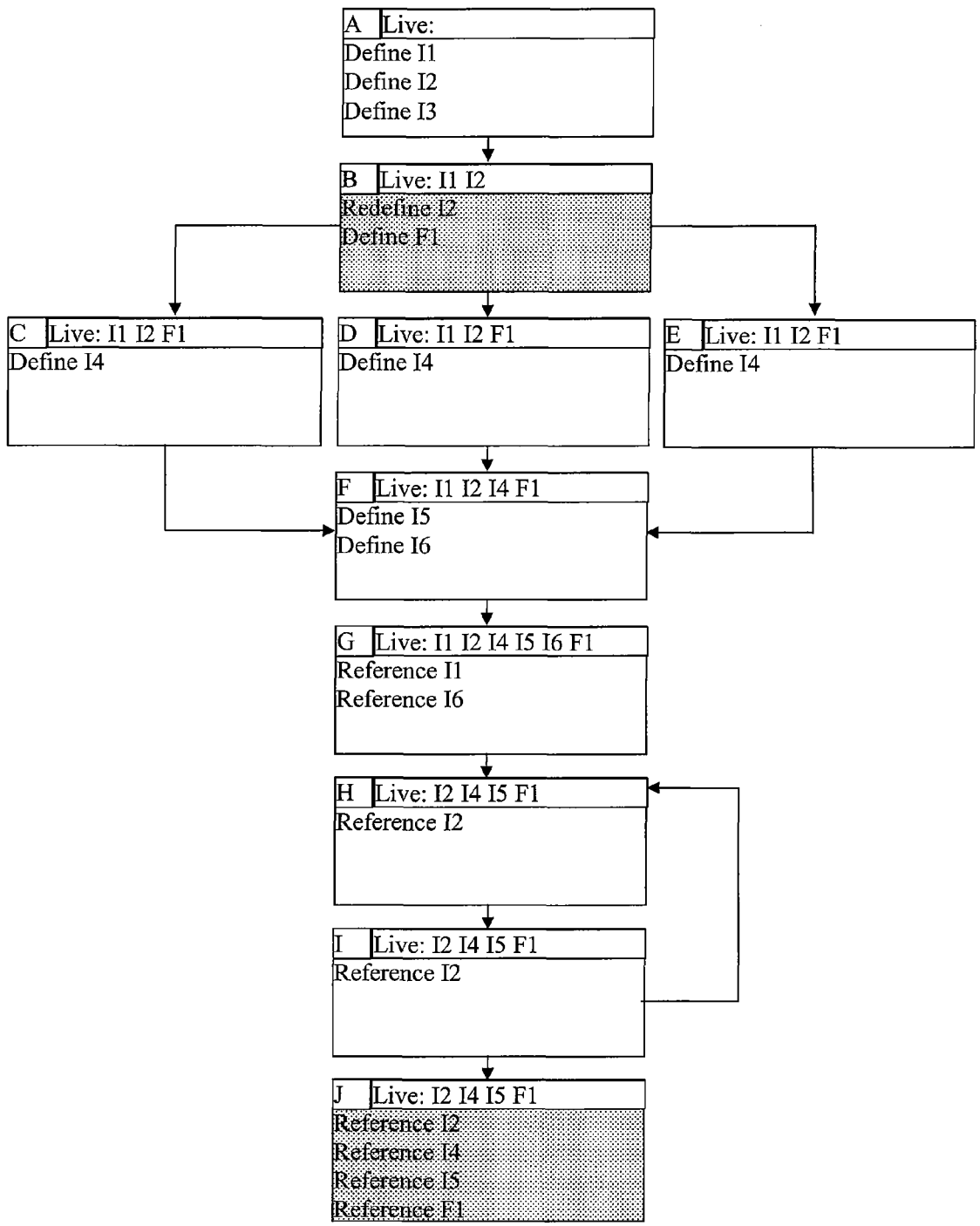
FIG. 6G is a diagram illustrating spill and reload locations for a sixth virtual register determined during the performance of the example implementation of the method of FIG. 4.
Figure 6H:
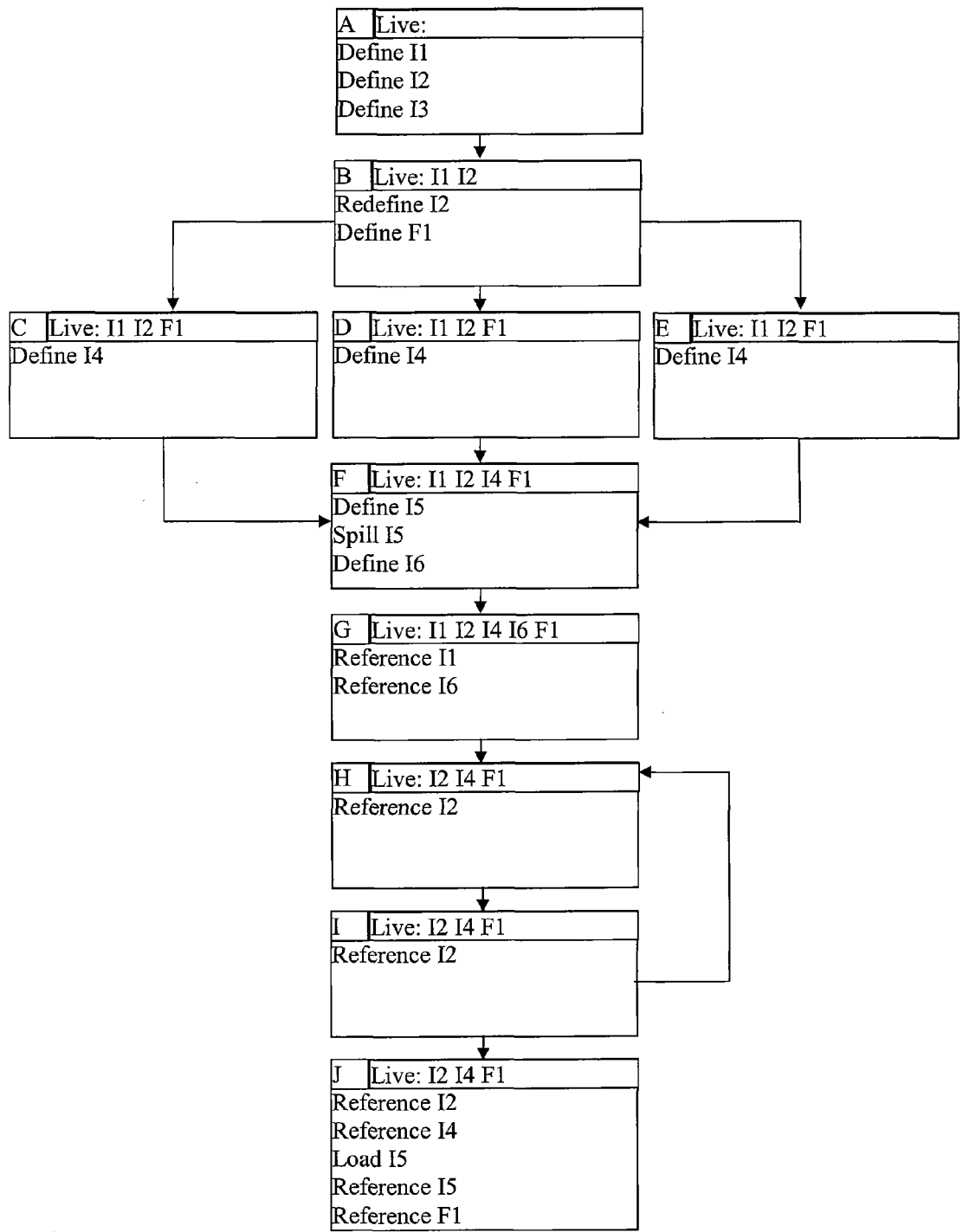
FIG. 6H is a diagram illustrating the execution flow of the code of the program subsequent to performance of the example implementation of the method of FIG. 4 where one virtual register is prespilled.
Figure 6I:
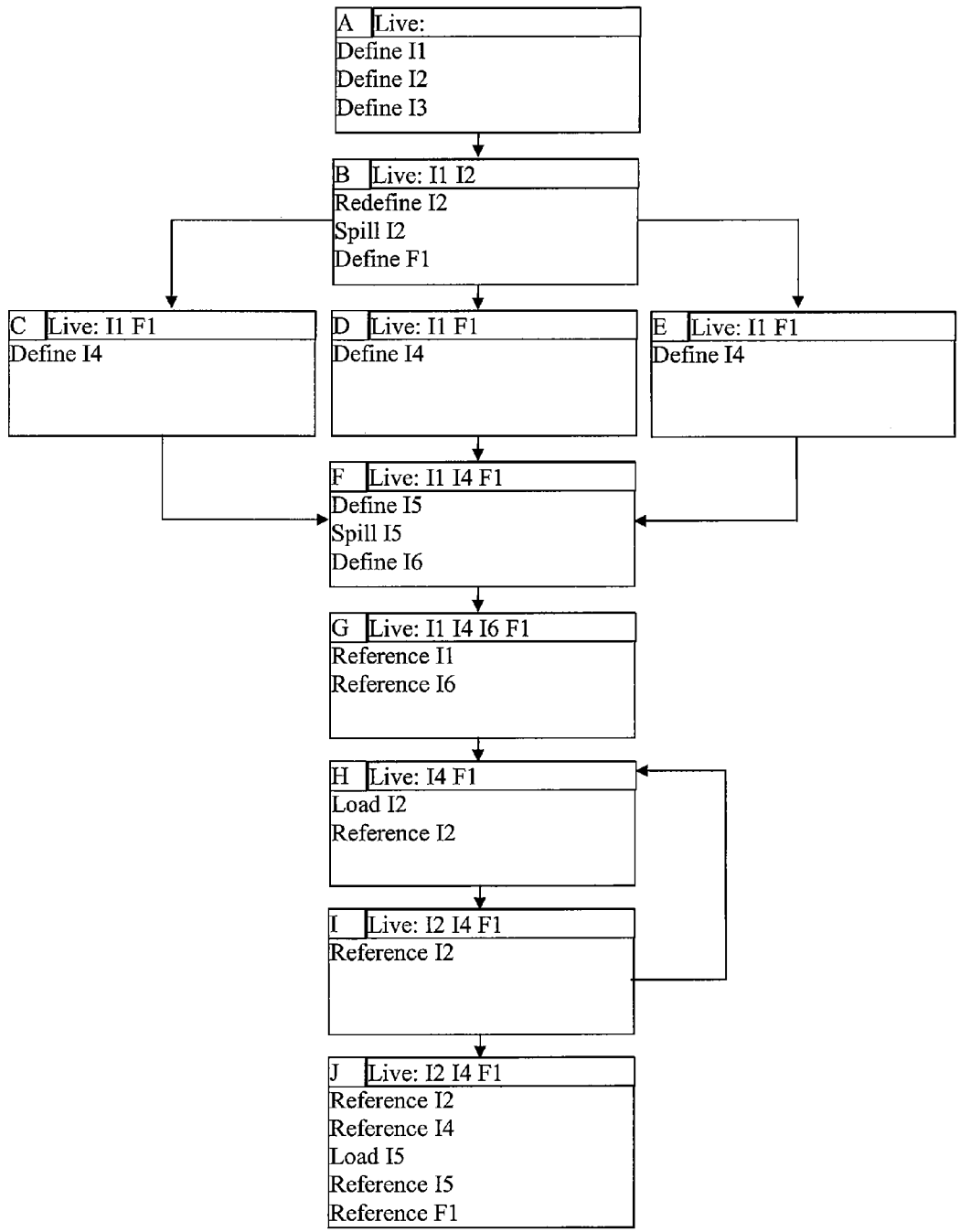
FIG. 6I is a diagram illustrating the execution flow of the code of the program subsequent to performance of the example implementation of the method of FIG. 4 where two virtual registers are prespilled.
Figure 6J:
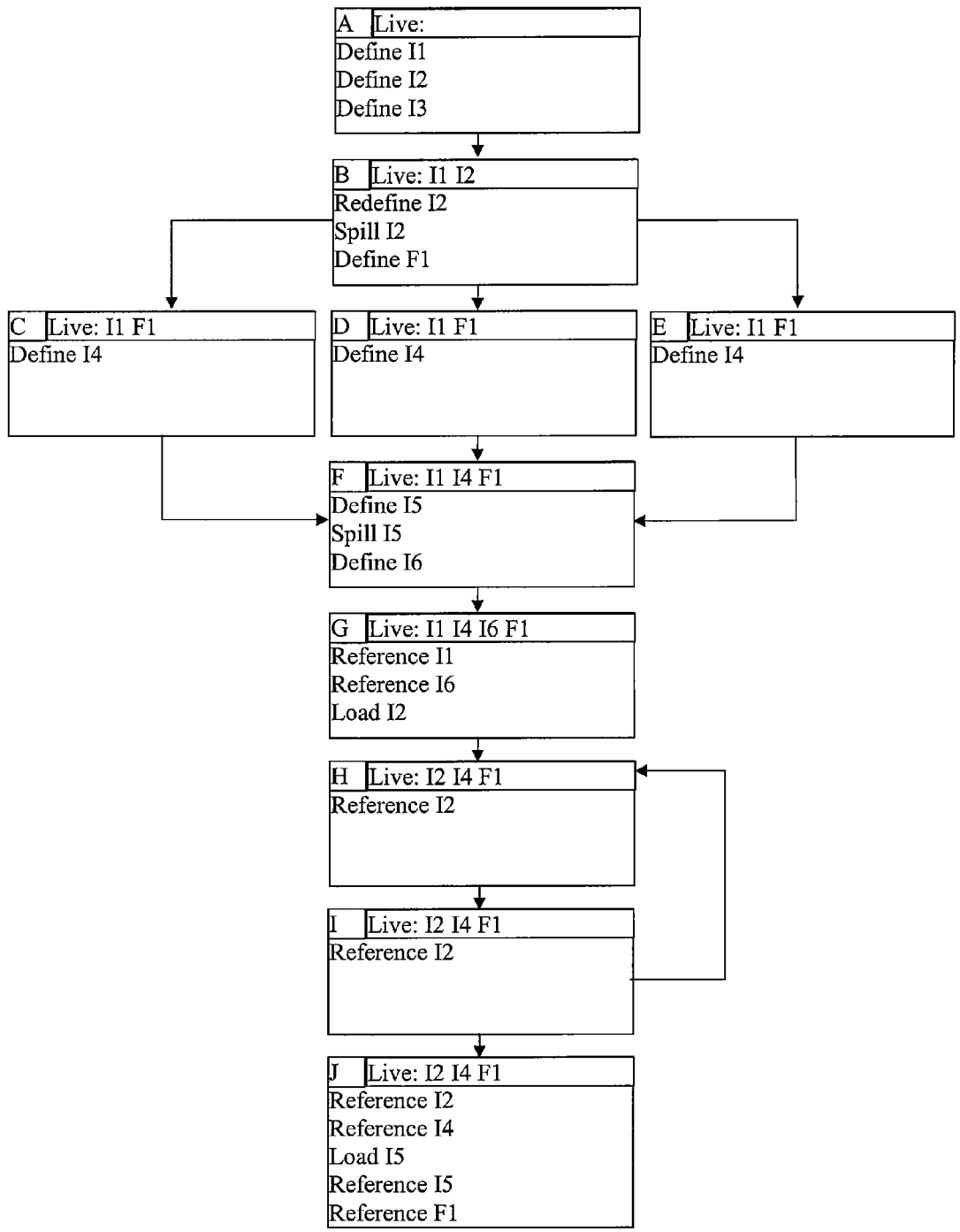
FIG. 6J is a diagram illustrating the execution flow of the code of the program subsequent to performance of the example implementation of the method of FIG. 4 where two virtual register are prespilled and after to the performance of a subsequent global instruction scheduling phase.
Figure 6K:
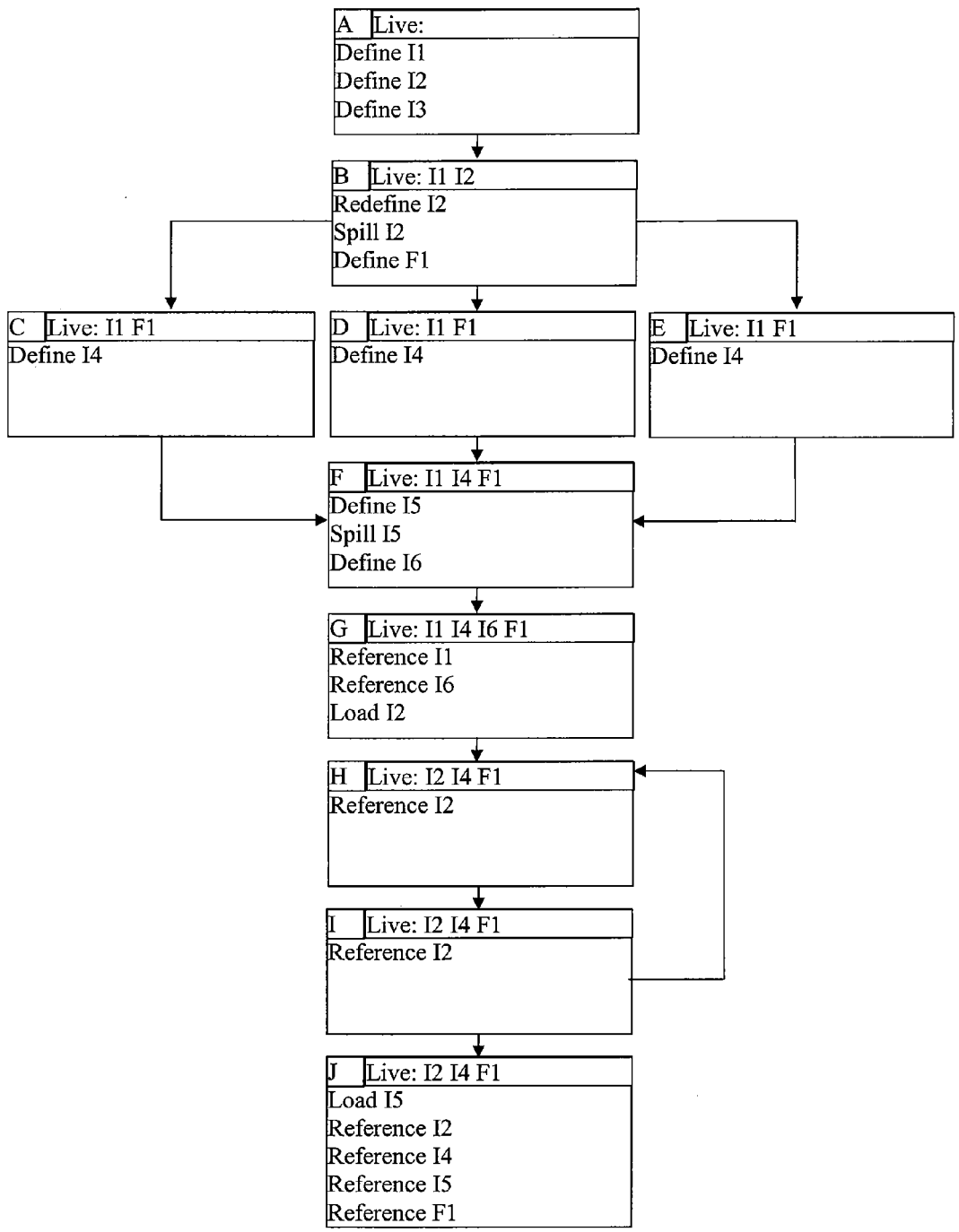
FIG. 6K is a diagram illustrating the execution flow of the code of the program subsequent to performance of the example implementation of the method of FIG. 4 where two virtual register are prespilled and after to the performance of subsequent global and local instruction scheduling phases.
Figure 7:
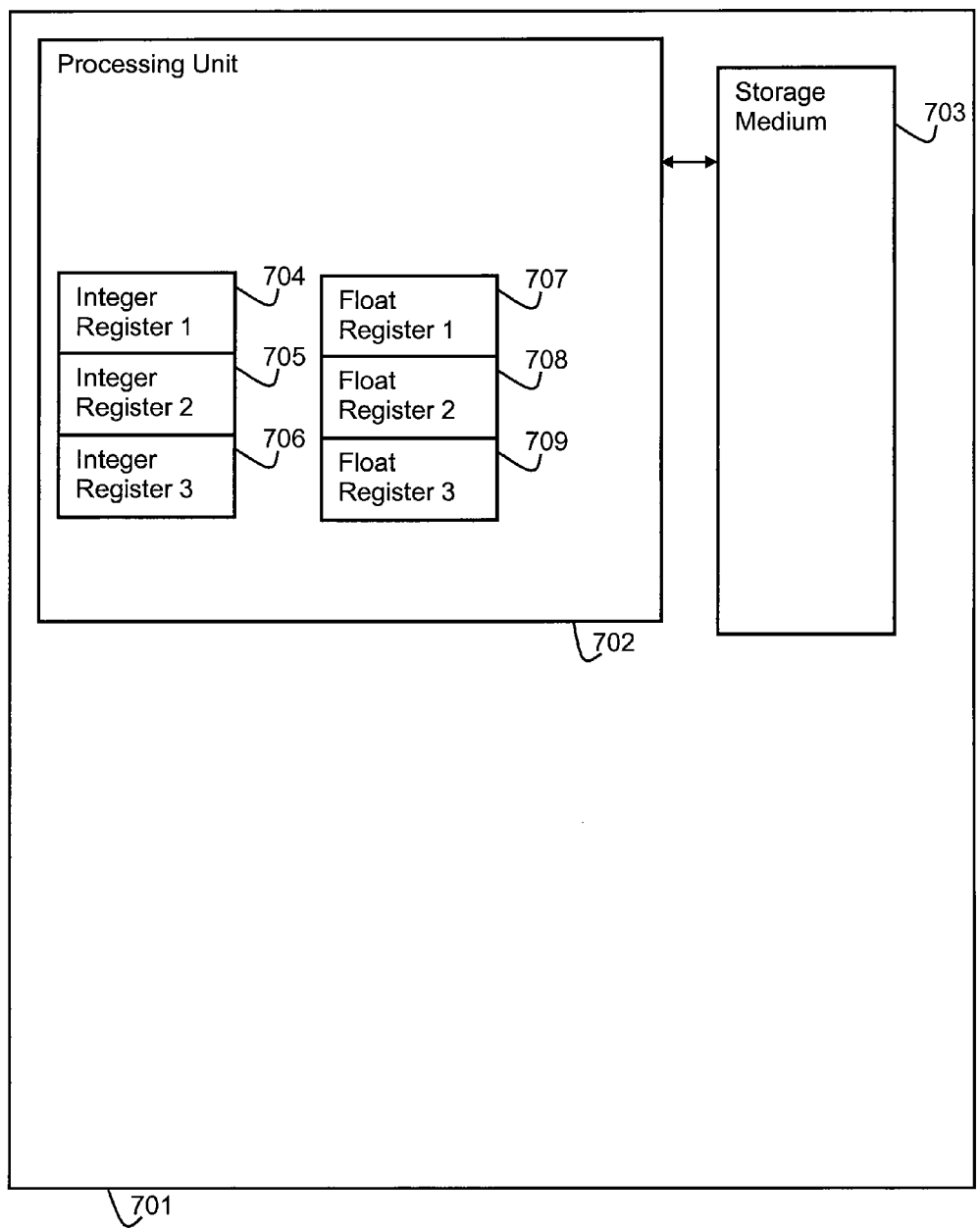
FIG. 7 is a block diagram illustrating a computing device 701 for which the example implementation of the method of FIG. 4 compiles the code of the program.

FIGS. 6A-6K are block diagrams illustrating a sample implementation of the performance of method 400 by a processing unit of a computing device (such as the computing device 301) which compiles the code of a program for the target computing device 701 illustrated in FIG. 7.

FIG. 6A illustrates the flow of execution 600A of the code prior to performing the prespill phase. As illustrated, the code is divided up into basic blocks A though J. Execution begins at basic block A and branches from basic block A to basic block B. No virtual registers are live into basic block A because execution begins at basic block A. Virtual integer registers I1, I2, and I3 are defined in basic block A. However, virtual integer register I3 is only live in basic block A so only virtual integer registers I1 and I2 are live into basic block B.

Virtual integer register I2 is redefined in basic block B and virtual floating point register F is defined in basic block B. Execution conditionally branches from basic block B to basic blocks C, D, and E. Virtual integer registers I1 and I2 and virtual floating point register F1 are live into basic blocks C, D, and E. Virtual integer register I4 is defined in basic blocks C, D, and E. Execution branches from basic blocks C, D, and E to basic block F.

Virtual integer registers I1, I2, and I4 and virtual floating point register F1 are live into basic block F. Virtual integer registers I5 and I6 are defined in basic block F. Execution branches from basic block F to basic block G. Virtual integer registers I1, I2, I4, I5, and I6 and virtual floating point register F1 are live into basic block G. Virtual integer registers I1 and I6 are referenced in basic block G. Execution branches from basic block G to basic block H. However, virtual integer registers I1 and I6 are not live after their respective reference in basic block G so only virtual integer registers I2, I4, and I5 and virtual floating point register F1 are live into basic block H.

Virtual integer register I2 is referenced in basic block H. Execution branches from basic block H to basic block I. Virtual integer registers I2, I4, and I5 and virtual floating point register F1 are live into basic block I. Virtual integer register I2 is referenced in basic block I. Execution conditionally branches from basic block I to basic blocks H and J. Virtual integer registers I2, I4, and I5 and virtual floating point register F1 are live into basic blocks H and J. Virtual integer registers I2, I4, I5 and virtual floating point register F1 are referenced in basic block J. After basic block J, execution ends.

When the processing unit of the computing device performs the prespill phase as part of compiling the code for the computing device 701, the processing unit identifies that the register pressure is excessive in basic block G. Referring to FIG. 7, computing device 701 includes a processing unit 702 and a storage media 703. The processing unit 702 includes three physical integer registers 704-706 and three physical floating point registers 707-709. However, referring again to FIG. 6A, there are five virtual integer registers live into basic block G. Thus, the register pressure is excessive because the virtual integer registers for block G exceed the physical integer registers.

The processing unit of the computing device then begins selecting candidate virtual registers for prespilling to reduce the register pressure. In this example, the processing unit selects a number of candidate virtual registers for prespilling equal to the amount that the virtual integer registers exceed the physical integer registers, or two. As part of selecting candidate virtual registers for prespilling, the processing unit analyzes results of data-flow analysis of the program to estimate spill and reload locations for each of the virtual integer registers, or where spill and reload instructions would be inserted for the respective virtual register. To estimate spill locations for each of the virtual registers, the processing unit identifies the previous basic block where the respective virtual register was last defined or redefined. To estimate reload locations for each of the virtual registers, the processing unit identifies the next basic block where the respective virtual register is referenced.

FIG. 6B illustrates the spill and reload locations 600B for virtual integer register I1. Basic block A is shaded to illustrate that it is the estimated spill location for virtual integer register I1. Basic block G is shaded illustrate that it is the estimated reload location for virtual integer register I1. FIG. 6C illustrates the spill and reload locations 600C for virtual integer register I2. Basic block B is shaded to illustrate that it is the estimated spill location for virtual integer register I2. Basic block H is shaded illustrate that it is the estimated reload location for virtual integer register I2. FIG. 6D illustrates the spill and reload locations 600D for virtual integer register I4. Basic blocks C, D, and E are shaded to illustrate that they are the estimated spill locations for virtual integer register I4. Basic block J is shaded illustrate that it is the estimated reload location for virtual integer register I4. FIG. 6E illustrates the spill and reload locations 600E for virtual integer register I5. Basic block F is shaded to illustrate that it is the estimated spill location for virtual integer register I5. Basic block J is shaded to illustrate that it is the estimated reload location for virtual integer register I5. FIG. 6F illustrates the spill and reload locations 600F for virtual integer register I6. Basic block F is shaded to illustrate that it is the estimated spill location for virtual integer register I6. Basic block G is shaded to illustrate that it is the estimated reload location for virtual integer register I6. FIG. 6G illustrates the spill and reload locations 600F for virtual floating point register F1. Basic block B is shaded to illustrate that it is the estimated spill location for virtual floating point register F1. Basic block J is shaded to illustrate that it is the estimated reload location for virtual floating point register F1.

Based on the estimated spill and reload locations for each of the virtual integer registers and other analysis of the results of data-flow analysis, the processing unit chooses candidate virtual registers for prespilling. First, the processing unit discards virtual integer registers I1 and I6 because they are referenced in basic block G. Next, the processing unit also discards virtual floating point register F1 because virtual floating point register F1 is not of the same type of register as the virtual registers that exceed the physical registers. Thus, the processing unit selects from virtual integer registers I2, I4, and I5.

As illustrated in FIG. 6B, the processing unit estimated that two instructions would be inserted to spill virtual integer register I2. However, the reload location for virtual integer register I2 is in basic block H, which is in a conditional loop with basic block I. In this example, the processing unit estimates that basic block H is likely to execute twice, giving the reload instruction for virtual integer register I2 an execution frequency of two. The spill location for virtual integer register I2 is in basic block B, which will only execute once. Thus, the processing unit determines that the execution frequency sum for virtual integer register I2 is three. The spill and reload locations for virtual integer register I4 are all in basic blocks that will only execute once, but there are three separate spill locations for virtual integer register I4. Thus, the processing unit determines that the execution frequency sum for virtual integer register I4 is four. The spill and reload locations for virtual integer register I5 are all in basic blocks that will only execute once and virtual integer register I5 does not have multiple spill or load locations. Thus, the processing unit determines that the execution frequency sum for virtual integer register I5 is two.

Based on the execution frequency sums for virtual registers I2, I4, and I5, the processing unit selects I5 as having the lowest execution frequency sum. FIG. 6H illustrates the flow of execution 600H of the code subsequent to performing the prespill phase if only virtual integer register I5 was prespilled. As illustrated, a spill instruction for virtual integer register I5 has been inserted in basic block F and a load instruction has been inserted in basic block J. However, in this example the processing unit selects two candidate virtual registers for prespilling. As such, the processing unit selects virtual register I2 as having the next lowest execution frequency sum. It is understood that selecting two candidates is a heuristic that provides the best performance for this particular implementation. In other implementations, selecting enough candidates the live virtual registers exceed the physical registers by a particular number or that the physical registers exceed the live virtual registers by a particular number may provide the best performance. The selection of candidates that provides the best performance may depend on the particular compiler utilized or the particular computing device that the code is compiled for.

FIG. 6I illustrates the flow of execution 600I of the code subsequent to performing the prespill phase where virtual integer registers I2 and I5 were prespilled. As illustrated, in addition to the spill and reload instructions for virtual integer register I5 shown in FIG. 6H, a spill instruction for virtual integer register I2 has been inserted in basic block B and a load instruction has been inserted in basic block H.

FIG. 8A illustrates the allocation of the virtual registers to the physical registers 704 to 709 during the execution of the code that may be set by the processing unit performing register allocation on the code 600I. In the first part of basic block A, virtual integer register I1 is stored in Integer Register 1 704, virtual integer register I2 is stored in Integer Register 2 705, and virtual integer register I3 is stored in Integer Register 3 706. During basic block A, when virtual integer register I3 is no longer live it is no longer stored in Integer Register 3 706. In the first part of basic block B, virtual integer register I1 is stored in Integer Register 1 704, virtual integer register I2 is stored in Integer Register 2 705, and virtual floating point register F1 is stored in Floating Point Register 1 707. During basic block B, when virtual integer register I2 is spilled it is no longer stored in Integer Register 2 705. During basic block C, virtual integer register I1 is stored in Integer Register 1 704, virtual integer register I4 is stored in Integer Register 3 706, and virtual floating point register F1 is stored in Floating Point Register 1 707. During basic block D, virtual integer register I1 is stored in Integer Register 1 704, virtual integer register I4 is stored in Integer Register 3 706, and virtual floating point register F1 is stored in Floating Point Register 1 707. During basic block E, virtual integer register I1 is stored in Integer Register 1 704, virtual integer register I4 is stored in Integer Register 3 706, and virtual floating point register F1 is stored in Floating Point Register 1 707. In the first part of basic block F, virtual integer register I1 is stored in Integer Register 1 704, virtual integer register I5 is stored in Integer Register 2 705, virtual integer register I4 is stored in Integer Register 3 706, and virtual floating point register F1 is stored in Floating Point Register 1 707. During basic block F, when virtual integer register I5 is spilled it is no longer stored in Integer Register 2 705 and when virtual integer register I6 is defined, it is stored in Integer Register 2 705. In the first part of basic block G, virtual integer register I1 is stored in Integer Register 1 704, virtual integer register I6 is stored in Integer Register 2 705, virtual integer register I4 is stored in Integer Register 3 706, and virtual floating point register F1 is stored in Floating Point Register 1 707. During basic block G, when virtual integer registers I1 and I6 are no longer live they are no longer respectively stored in Integer Register 1 704 and Integer Register 2 705. During basic block H, virtual integer register I2 is stored in Integer Register 2 705, virtual integer register I4 is stored in Integer Register 3 706, and virtual floating point register F1 is stored in Floating Point Register 1 707. During basic block I, virtual integer register I2 is stored in Integer Register 2 705, virtual integer register I4 is stored in Integer Register 3 706, and virtual floating point register F1 is stored in Floating Point Register 1 707. During basic block J, virtual register I5 is stored in Integer Register 1 704, virtual integer register I2 is stored in Integer Register 2 705, virtual integer register I4 is stored in Integer Register 3 706, and virtual floating point register F1 is stored in Floating Point Register 1 707.

FIG. 6J illustrates the flow of execution 600J of the code subsequent to performing the prespill phase (the results of which illustrated in FIG. 6I) and after performing a global instruction scheduling phase. As illustrated, the reload instruction for virtual integer register I2 has been moved from basic block H to basic block G. This is possible as virtual integer register I6 is only live through part of basic block G so the reload instruction for virtual integer register I2 can be moved to basic block G after virtual integer register I6 is no longer live. Thus, the reload instruction for virtual integer register I2 will not have to be executed multiple times like when it was located in basic block H.

FIG. 8B illustrates the allocation of the virtual registers to the physical registers 704 to 709 during the execution of the code that may be set by the processing unit performing register allocation on the code 600J. In the first part of basic block A, virtual integer register I1 is stored in Integer Register 1 704, virtual integer register I2 is stored in Integer Register 2 705, and virtual integer register I3 is stored in Integer Register 3 706. During basic block A, when virtual integer register I3 is no longer live it is no longer stored in Integer Register 3 706. In the first part of basic block B, virtual integer register I1 is stored in Integer Register 1 704, virtual integer register I2 is stored in Integer Register 2 705, and virtual floating point register F1 is stored in Floating Point Register 1 707. During basic block B, when virtual integer register I2 is spilled it is no longer stored in Integer Register 2 705. During basic block C, virtual integer register I1 is stored in Integer Register 1 704, virtual integer register I4 is stored in Integer Register 3 706, and virtual floating point register F1 is stored in Floating Point Register 1 707. During basic block D, virtual integer register I1 is stored in Integer Register 1 704, virtual integer register I4 is stored in Integer Register 3 706, and virtual floating point register F1 is stored in Floating Point Register 1 707. During basic block E, virtual integer register I1 is stored in Integer Register 1 704, virtual integer register I4 is stored in Integer Register 3 706, and virtual floating point register F1 is stored in Floating Point Register 1 707. In the first part of basic block F, virtual integer register I1 is stored in Integer Register 1 704, virtual integer register I5 is stored in Integer Register 2 705, virtual integer register I4 is stored in Integer Register 3 706, and virtual floating point register F1 is stored in Floating Point Register 1 707. During basic block F, when virtual integer register I5 is spilled it is no longer stored in Integer Register 2 705 and when virtual integer register I6 is defined, it is stored in Integer Register 2 705. In the first part of basic block G, virtual integer register I1 is stored in Integer Register 1 704, virtual integer register I6 is stored in Integer Register 2 705, virtual integer register I4 is stored in Integer Register 3 706, and virtual floating point register F1 is stored in Floating Point Register 1 707. During basic block G, when virtual integer registers I1 and I6 are no longer live they are no longer respectively stored in Integer Register 1 704 and Integer Register 2 705 and virtual integer register I2 is stored in Integer Register 2 705. During basic block H, virtual integer register I2 is stored in Integer Register 2 705, virtual integer register I4 is stored in Integer Register 3 706, and virtual floating point register F1 is stored in Floating Point Register 1 707. During basic block I, virtual integer register I2 is stored in Integer Register 2 705, virtual integer register I4 is stored in Integer Register 3 706, and virtual floating point register F1 is stored in Floating Point Register 1 707. During basic block J, virtual register I5 is stored in Integer Register 1 704, virtual integer register I2 is stored in Integer Register 2 705, virtual integer register I4 is stored in Integer Register 3 706, and virtual floating point register F1 is stored in Floating Point Register 1 707.

FIG. 6K illustrates the flow of execution 600K of the code subsequent to performing the prespill phase (the results of which illustrated in FIG. 6I) and after performing a local instruction scheduling phase. As illustrated, the reload instruction for virtual integer register I5 has been moved within basic block J so that it precedes the reference to virtual integer register I5 by several instructions. This avoids the delay that would result if the reload instruction immediately preceded the reference, as execution would halt waiting for virtual integer register I5 to reload before it could be referenced. However, this may not change how registers are allocated as compared to register allocation for the flow of execution 600J, and thus the allocation of registers may be the same as illustrated in FIG. 8B.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readably by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method for performing a prespill phase in a compiler, comprising:
analyzing code of a program, the code including virtual registers, utilizing at least one processing unit, to determine at least one point in the code where a number of live virtual registers exceeds a number of physical registers of a target machine, the code stored in at least one non-transitory storage media;
selecting, utilizing the at least one processing unit, a plurality of virtual registers from the virtual registers included in the code as prespilling candidates for the at least one point in the code;
choosing, utilizing the at least one processing unit, at least one of the plurality of selected virtual registers to prespill; and
prior to performing any register allocation on the code, inserting, utilizing the at least one processing unit, at least one spill instruction and at least one reload instruction in the code to prespill the at least one of the plurality of selected virtual registers, reducing an amount that the number of live virtual registers exceeds the number of physical registers of the target machine for the at least one point in the code.

2. The method of claim 1, wherein the at least one of the plurality of virtual registers comprises a number of the plurality of virtual registers, the number at least equaling the amount that the number of live virtual registers exceeds the number of physical registers for the at least one point in the code.

3. The method of claim 1, wherein the code is divided into a plurality of basic blocks and the at least one point in the code comprises a basic block of the plurality of basic blocks.

4. The method of claim 1, wherein said analyzing code of a program, utilizing at least one processing unit, to determine at least one point in the code where a number of live virtual registers exceeds a number of physical registers of a target machine comprises:
determining that the at least one point in the code has an execution frequency that exceeds an execution frequency threshold.

5. The method of claim 1, wherein the virtual registers comprise a same type of register as the physical registers.

6. The method of claim 1, wherein the code is divided into a plurality of basic blocks, further comprising:
performing a local instruction scheduling phase, utilizing the at least one processing unit, that moves at least one of the at least one spill instruction or the at least one reload instruction from a first position within a basic block of the plurality of basic blocks to a second position within the basic block.

7. The method of claim 1, wherein the code is divided into a plurality of basic blocks, further comprising:
performing a global instruction scheduling phase, utilizing the at least one processing unit, that moves at least one of the at least one spill instruction or the at least one reload instruction from a first basic block of the plurality of basic blocks to a second basic block of the plurality of basic blocks.

8. The method of claim 1, wherein said analyzing code of a program, utilizing at least one processing unit, to determine at least one point in the code where a number of live virtual registers exceeds a number of physical registers of a target machine comprises:
performing data-flow analysis on the code, utilizing the at least one processing unit, to determine liveness of the virtual registers.

9. The method of claim 1, wherein the at least one spill instruction and the at least one reload instruction are inserted prior to performing an instruction scheduling phase.

10. The method of claim 1, wherein said selecting, utilizing the at least one processing unit, a plurality of virtual registers as prespilling candidates for the at least one point in the code comprises:
finding at least one spill location and at least one reload location in the code for each of at least a portion of the plurality of virtual registers.

11. The method of claim 1, wherein said selecting, utilizing the at least one processing unit, a plurality of virtual registers from virtual registers of the code as prespilling candidates for the at least one point in the code comprises:
comparing at least one prespill metric of each of at least a portion of the virtual registers of the code; and
selecting the plurality of virtual registers from the at least the portion of the virtual registers of the code of the code based on the comparison.

12. The method of claim 11, wherein the at least one prespill metric comprises a number of instructions in the code that reference the respective virtual register.

13. The method of claim 11, wherein the at least one prespill metric comprises a number of times in the code that the respective virtual register is redefined.

14. The method of claim 11, wherein the at least one prespill metric comprises at least one of an execution frequency sum of all of instructions to be inserted in the code to spill the respective virtual register or execution frequency sum of instructions to be inserted in the code to reload the respective virtual register.

15. The method of claim 11, wherein the code is divided into a plurality of basic blocks and the at least one prespill metric comprises an execution frequency of a basic block of the basic blocks that includes at least one of a spill location for the respective virtual register or a reload location for the respective virtual register.

16. The method of claim 11, wherein said selecting, utilizing the at least one processing unit, a plurality of virtual registers from virtual registers of the code as prespilling candidates for the at least one point in the code comprises:
calculating the at least one prespill metric for each of the at least the portion of the virtual registers of the code; and
assigning the respective at least one prespill metric to the respective virtual register.

17. The method of claim 11, wherein said comparing at least one prespill metric of each of at least a portion of the virtual registers of the code comprises:
determining that the at least one prespill metric of a first virtual register of the at least the portion of the virtual registers of the code and the at least one prespill metric of a second virtual register of the at least the portion of the virtual registers of the code are equal; and
comparing at least one additional prespill metric of each of the first virtual register and the second virtual register.

18. The method of claim 1, wherein said choosing, utilizing the at least one processing unit, at least one of the plurality of virtual registers to prespill comprises:
comparing at least one prespill metric of each of the plurality of virtual registers; and
choosing the at least one of the plurality of virtual registers based on the comparison.

19. A system for performing a prespill phase in a compiler, comprising:
at least one non-transitory tangible storage media, operable to store code of a program, the code including virtual registers;
at least one processing unit, communicably coupled to the at least one non-transitory tangible storage media, operable to implement a compiler that performs a prespill phase on the code comprising:
analyzing the code to determine at least one point in the code where a number of live virtual registers exceeds a number of physical registers of a target machine;
selecting a plurality of virtual registers from the virtual registers included in the code as prespilling candidates for the at least one point in the code;
choosing at least one of the plurality of selected virtual registers to prespill; and
inserting at least one spill instruction and at least one reload instruction in the code to prespill the at least one of the plurality of selected virtual registers, reducing an amount that the number of live virtual registers exceeds the number of physical registers of the target machine;
wherein the compiler inserts the at least one spill instruction and the at least one reload instruction in the code prior to performing any register allocation on the code.

20. A non-transitory computer program product, comprising:
a first set of instructions, stored in at least one non-transitory computer readable storage medium, executable by at least one processing unit to analyze code of a program, the code including virtual registers, to determine at least one point in the code where a number of live virtual registers exceeds a number of physical registers of a target machine;
a second set of instructions, stored in the at least one non-transitory computer readable storage medium, executable by the at least one processing unit to select a plurality of virtual registers from the virtual registers included in the code as prespilling candidates for the at least one point in the code;
a third set of instructions, stored in the at least one non-transitory computer readable storage medium, executable by the at least one processing unit to choose at least one of the plurality of selected virtual registers to prespill; and
a fourth set of instructions, stored in the at least one non-transitory computer readable storage medium, executable by the at least one processing unit to, prior to performing any register allocation on the code, insert at least one spill instruction and at least one reload instruction in the code to prespill the at least one of the plurality of selected virtual registers, reducing an amount that the number of live virtual registers exceeds the number of physical registers of the target machine.

* * * * *